US008213041B2

(12) United States Patent
Yamada et al.

(10) Patent No.: US 8,213,041 B2
(45) Date of Patent: Jul. 3, 2012

(54) IMAGE FORMING APPARATUS PROVIDED WITH AN IMAGE FILING FUNCTION FOR SAVING FILES IN AN ORGANIZED MANNER

(75) Inventors: Muneki Yamada, Osaka (JP); Toyoaki Oku, Osaka (JP)

(73) Assignee: Kyocera Mita Corporation (JP)

( * ) Notice: Subject to any disclaimer, the term of this patent is extended or adjusted under 35 U.S.C. 154(b) by 1317 days.

(21) Appl. No.: 11/903,675

(22) Filed: Sep. 24, 2007

(65) Prior Publication Data

US 2008/0074689 A1 Mar. 27, 2008

(30) Foreign Application Priority Data

| Sep. 25, 2006 | (JP) | 2006-259792 |
| Sep. 25, 2006 | (JP) | 2006-259793 |
| Sep. 25, 2006 | (JP) | 2006-259794 |
| Sep. 25, 2006 | (JP) | 2006-259795 |
| Sep. 25, 2006 | (JP) | 2006-259796 |

(51) Int. Cl.
*G06K 15/00* (2006.01)

(52) U.S. Cl. ...................................... 358/1.16
(58) Field of Classification Search .................. 358/1.16
See application file for complete search history.

(56) References Cited

U.S. PATENT DOCUMENTS

| 2002/0081039 A1* | 6/2002 | Funahashi | 382/305 |
| 2005/0195446 A1* | 9/2005 | Kasatani | 358/402 |
| 2006/0050292 A1 | 3/2006 | Morikawa et al. | |
| 2006/0082816 A1* | 4/2006 | Daniel et al. | 358/1.15 |
| 2006/0132834 A1* | 6/2006 | Kamimura | 358/1.15 |
| 2006/0190941 A1* | 8/2006 | Kobayashi et al. | 717/174 |

FOREIGN PATENT DOCUMENTS

| JP | 2002-46869 | 2/2002 |
| JP | 2003-110783 | 4/2003 |
| JP | 2004-199456 | 7/2004 |
| JP | 2006-35583 | 2/2006 |
| JP | 2006-76072 | 3/2006 |

* cited by examiner

*Primary Examiner* — Benny Q Tieu
*Assistant Examiner* — Eric A Rust
(74) *Attorney, Agent, or Firm* — Gerald E. Hespos; Michael J. Porco

(57) ABSTRACT

An image forming apparatus is provided with a processor, a storage unit for storing a program and data, a function unit for performing functional operations; and an interactive input/output unit. The storage unit includes first storage areas, second storage areas, and third storage areas, which are hierarchized. The program causes the processor to display specified information allotted to the first storage areas on the interactive input/output unit. If one first storage area is selected, information of the second storage areas related to the selected first storage area is displayed on the interactive input/output unit. If one second storage area is selected, information of files in the third storage areas included in the selected second storage area and the names of processes to be performed to the files are displayed on the interactive input/output unit. If the file and process are selected, the process is performed to this file.

21 Claims, 32 Drawing Sheets

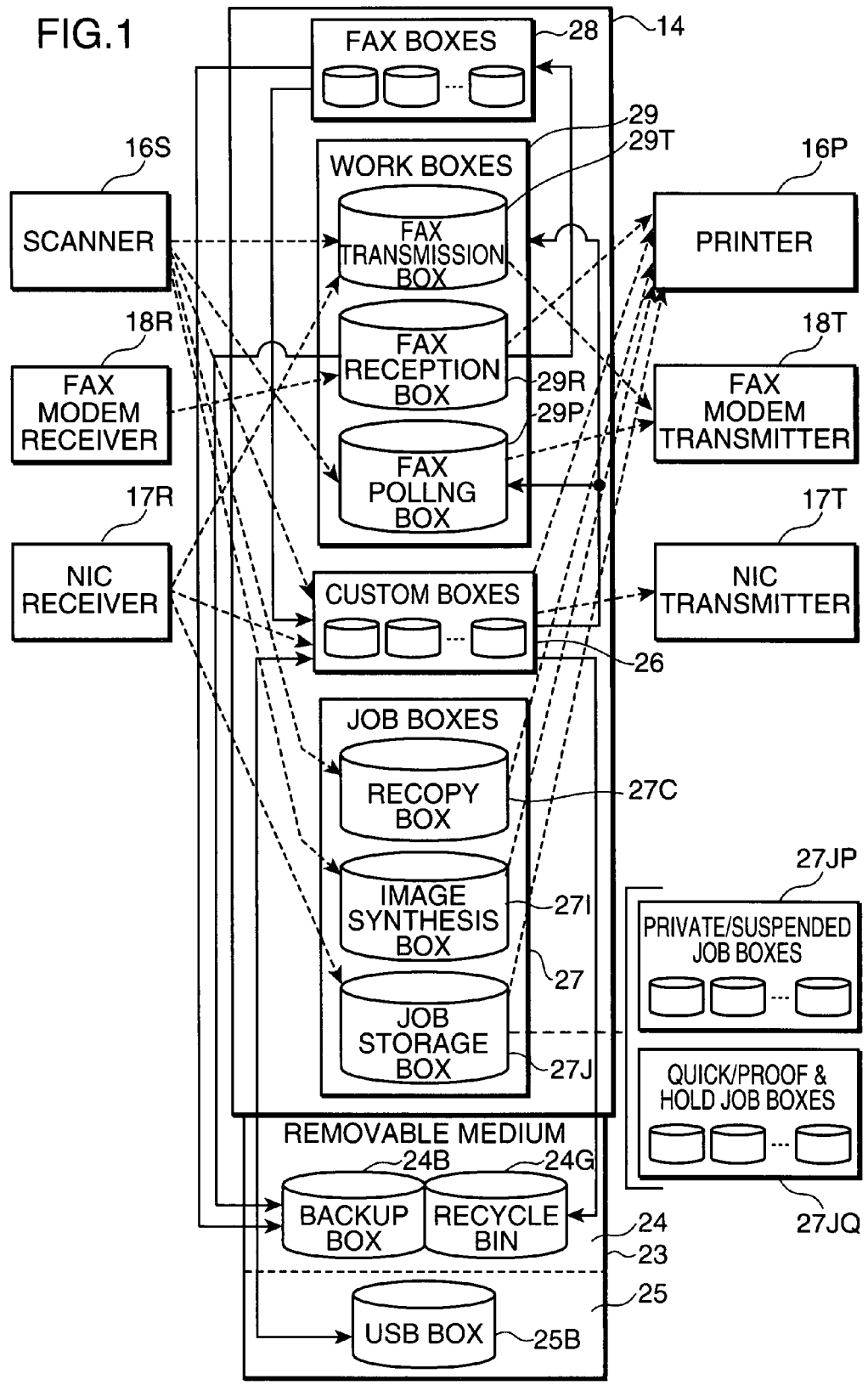

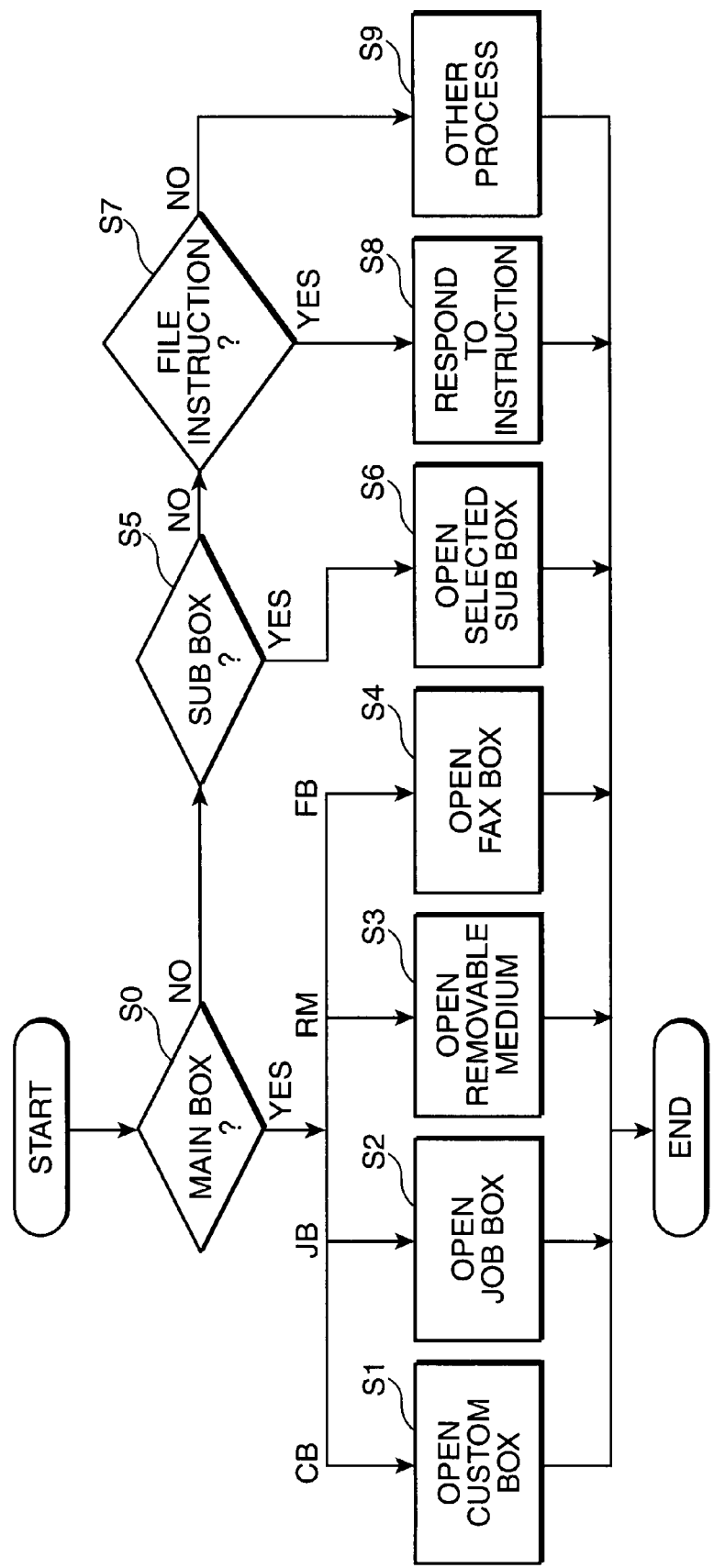

FIG.8

| Box No. 003 | | | | |
|---|---|---|---|---|
| △ DOCUMENT NAME | △ DATE REGISTRATION DATE | △ SIZE | | |
| ☑ Document1 | 2006/08/03 09:17 | 126KB | | △ |
| ☐ Document2 | 2006/08/03 11:02 | 108KB | | |
| ☑ Document3 | 2006/07/31 15:50 | 12.1MB | | 6/153 |
| ☐ Document4 | 2006/07/26 16:11 | 273KB | | |
| ☐ Document5 | 2006/07/26 16:12 | 119KB | | |
| ☐ Document6 | 2006/07/27 14:58 | 8.4MB | | ▽ |

| | | | | STORAGE PERIOD CHANGE |
|---|---|---|---|---|
| | | | | DETAIL |
| PRINT | TRANSMIT | MERGE | MOVE | DELETE | FILE STORAGE |
| | | | | CLOSE |

FIG.12

Box No. 003   STORAGE PERIOD CHANGE

| DOCUMENT NAME | PLANNED DELETION DATE |
|---|---|
| Document1 | 2004/08/06 |
| Document3 | 2006/05/07 |
|  |  |
|  |  |
|  |  |

◉ EXTENSION
○ CHANGE
○ ∞

| Y | M | W | D |
|---|---|---|---|
|  |  |  | 15 |

CONFIRM   CANCEL

CLOSE 41
80

FIG.16

| TRANSMISSION PREPARATION | | |
|---|---|---|
| DOCUMENT NAME : Document1 | | |

| ADDRESS | DETAIL | |
|---|---|---|
| Kyocera Mita | 0342557203374 | |
| Jiro Suzuki | ichiro@xyzabc.jp | |
| Yuusi Sato | satoyuu@abcde.ne.jp | |

ADDRESS BOOK

MAIL ADDRESS ADD

FOLDER PASS ADD

FAX NUMBER ADD

DELETE

MERGE | DETAIL/EDIT | DELETE | RETRANSMIT

001 Kyocera | 002 Abc Inc. | 003 Xyz corp | 004 Suzuki | 005 Sato

006 John | 007 A&B | 008 UScmpy | 009 Yuki | 010 Yamada

ADDRESS | QUICK SETUP | FUNCTION

FIG.18

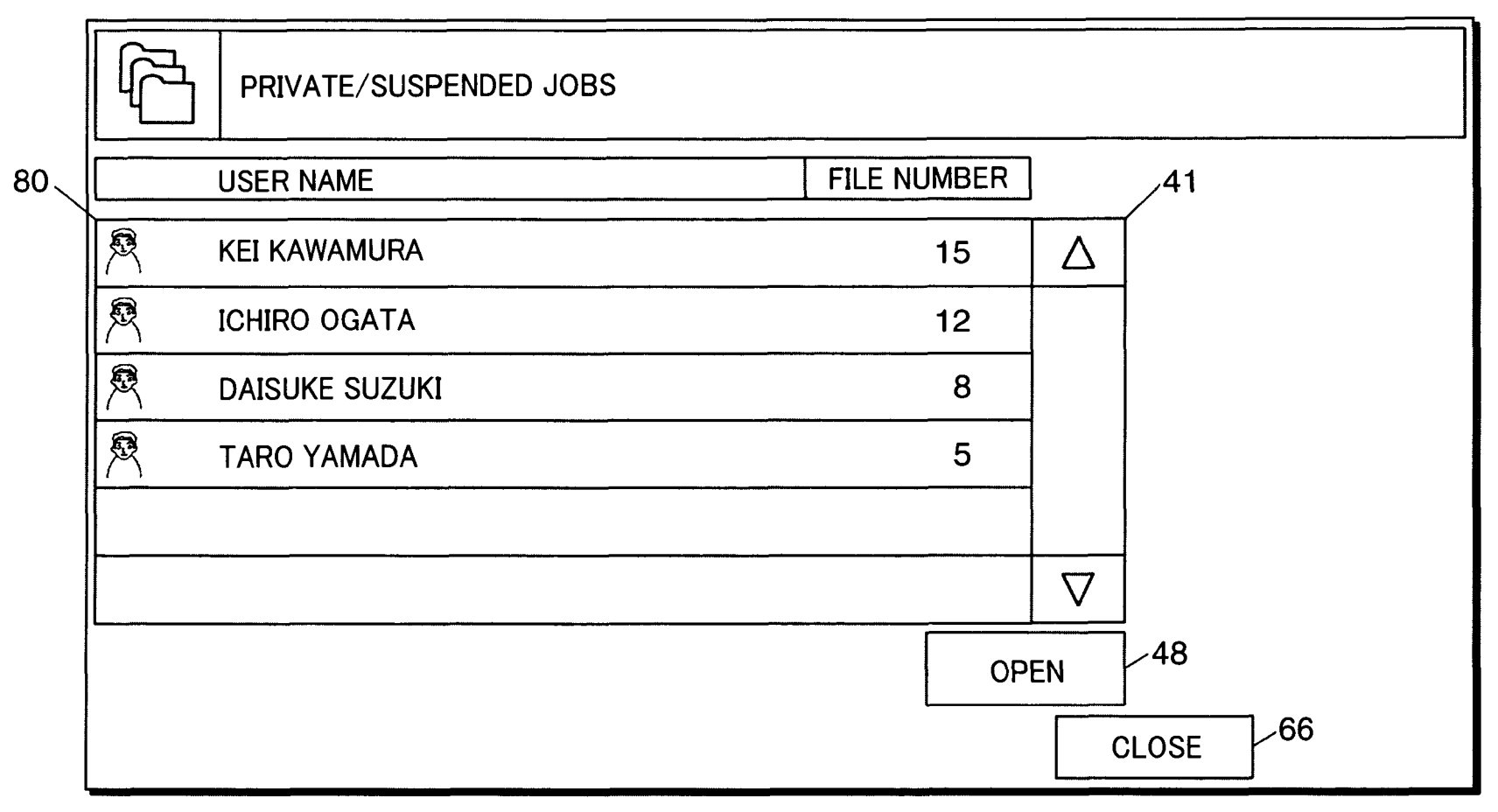

PRIVATE/SUSPENDED JOBS

| USER NAME | FILE NUMBER |
|---|---|
| KEI KAWAMURA | 15 |
| ICHIRO OGATA | 12 |
| DAISUKE SUZUKI | 8 |
| TARO YAMADA | 5 |

◁ 41

▷ 48

OPEN

CLOSE — 66

PRIVATE/SUSPENDED JOBS

| | △ DOCUMENT NAME | △ DATE | P | △SIZE |
|---|---|---|---|---|
| ✓ | 📄 Document1 | 2004/08/03 00:00 | ☐ | 126KB |
| ✓ | 📄 Document2 | 2004/08/03 01:02 | ✓ | 108KB |
| ✓ | 📄 Document3 | 2006/04/30 15:50 | ☐ | 12.1MB |
| ☐ | 📄 Document4 | 2006/07/26 16:11 | ☐ | 273KB |
| ☐ | 📄 Document5 | 2006/07/26 16:15 | ☐ | 119KB |
| ☐ | 📄 Document6 | 2006/07/27 14:58 | ✓ | 8.4MB |

△ 1/153 ▽

90

PRINT — 60

DETAIL — 47

DELETE

CLOSE

FIG.20

QUICK/PROOF & HOLD JOBS

| △ DOCUMENT NAME | △ DATE | Q | △ SIZE |
|---|---|---|---|
| Document1 | 2004/08/03 00:00 | ✓ | 126KB |
| Document2 | 2004/08/03 01:02 | ✓ | 108KB |
| Document3 | 2006/04/30 15:50 | ✓ | 12.1MB |
| Document4 | 2006/07/26 16:11 | ✓ | 273KB |
| Document5 | 2006/07/26 16:15 | | 119KB |
| Document6 | 2006/07/27 14:58 | ✓ | 8.4MB |

△ 41

1/153

▽

DETAIL

DELETE

CLOSE

PRINT — 60

USER BOX OVERALL INFORMATION STRUCTURE

130
| USER END POINTER |
| USER START POINTER |
| USER END POINTER |
| USER START POINTER |
| PRESENT USER POINTER |
| PRESENT JOB POINTER |
| PRESENT LIST |

FIG.21B

USER STRUCTURE

131
| PREVIOUS USER POINTER |
| NEXT USER POINTER |
| USER NAME |
| PASSWORD |
| JOB START POINTER |
| JOB END POINTER |

FIG.21D

USER STRUCTURE

133
| PREVIOUS USER POINTER |
| NEXT USER POINTER |
| USER NAME |
| JOB START POINTER |
| JOB END POINTER |

FIG.21C

JOB STRUCTURE

132
| PREVIOUS JOB POINTER |
| STORAGE MODE |
| NUMBER OF SETS |
| JOB NAME |
| FILE NAME |
| NEXT JOB POINTER |

FIG.21E

JOB STRUCTURE

134
| PREVIOUS JOB POINTER |
| STORAGE MODE |
| NUMBER OF SETS |
| JOB NAME |
| STORAGE PERIOD |
| FILE NAME |
| NEXT JOB POINTER |

FIG.23

| SUPERIMPOSED FORM | | | |
|---|---|---|---|
| △ FORM NAME | △ SIZE | 111 112 113 | |
| ✓ FORM NAME 1 | A4 | △ | DETAIL — 47 |
| ☐ FORM NAME 2 | A4 | | |
| ☐ FORM NAME 3 | A3 | 6/12 | DELETE — 64 |
| ☐ FORM NAME 4 | A4 | | FILE STORAGE — 46 |
| ✓ FORM NAME 5 | B5 | | |
| ☐ FORM NAME 6 | LETTER | ▽ | CLOSE — 66 |
| PRINT | | | |

110

USER BOX OVERALL INFORMATION STRUCTURE

USER STRUCTURE

FORM STRUCTURE

FIG.31

| △ No | △ BOX NAME | △ OWNER | USAGE(%) | |
|---|---|---|---|---|
| 0001 | FIRST RESEARCH DEPT. | JIRO SUZUKI | 58% | △ |
| 0002 | SECOND RESEARCH DEPT. | KAZOO TANAKA | 26% | 06/99 |
| 0003 | PATENT DEPT. | DAIKI TSURUTA | 32% | |
| 0004 | ADMINISTRATIVE DEPT. | YUUTA KOMORI | 17% | |
| 0005 | FIRST SALES DEPT. | YOSHIO FUJITA | 46% | ▽ |
| 0006 | SECOND SALES DEPT. | FUMIAKI OHTA | 73% | |

FAX BOX

DETAIL   OPEN

CUSTOM BOX | JOB BOX | FAX BOX | REMOVABLE MEDIUM 140  47  48

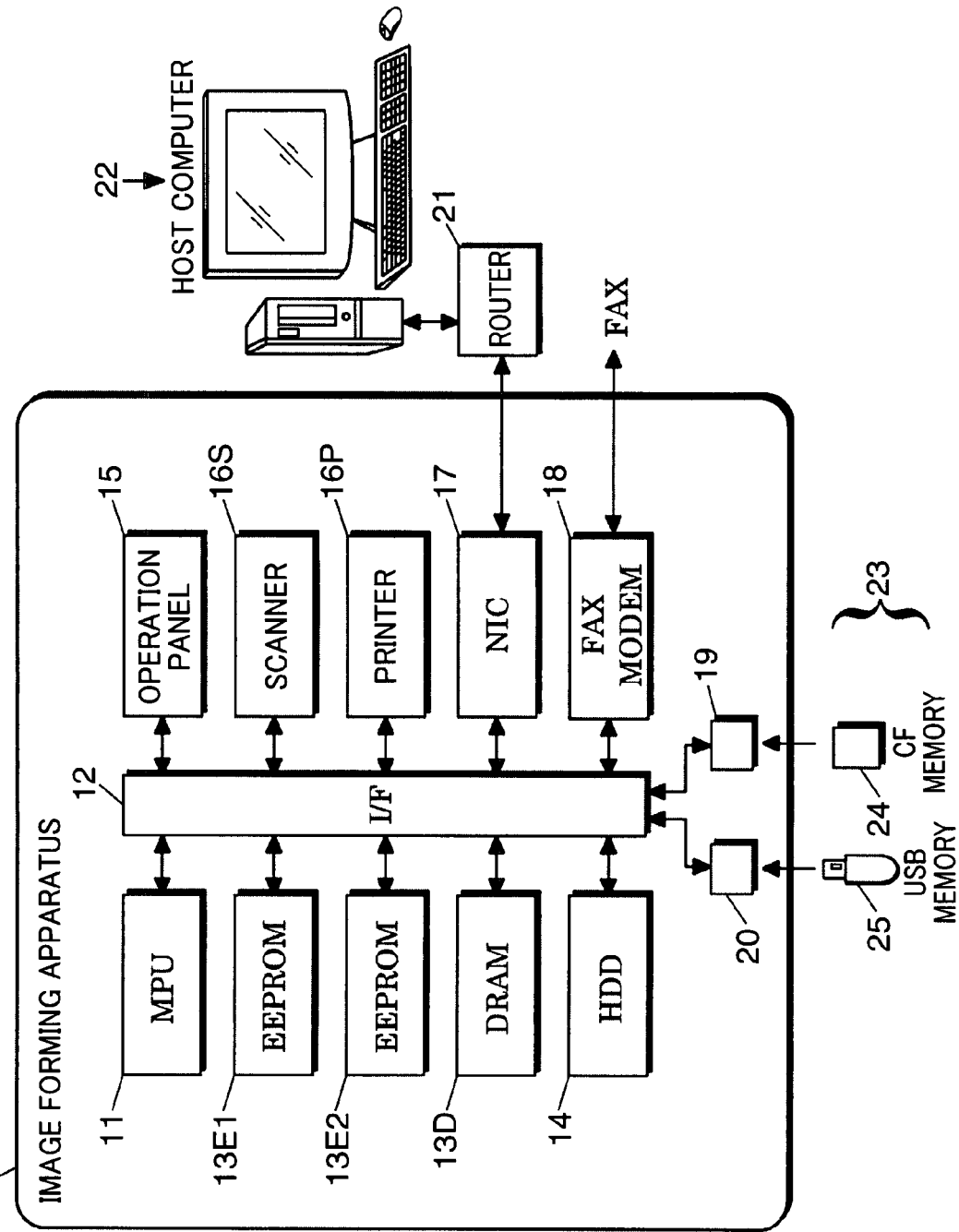

IMAGE FORMING APPARATUS PROVIDED WITH AN IMAGE FILING FUNCTION FOR SAVING FILES IN AN ORGANIZED MANNER

BACKGROUND OF THE INVENTION

1. Field of the Invention

The present invention relates to an image forming apparatus provided with an image filing function for saving files in an organized manner.

2. Description of the Related Art

An image forming apparatus including a hard disk and connected with a network is provided with an image filing function. Since the number of files and the number of types of files to be saved increase in an image forming apparatus used by many people, particular in a complex machine, it is necessary to save the files in an organized manner so that a desired file can be easily selected to perform a job such as printing or transmission.

Japanese Unexamined Patent Publication No. 2006-76072 discloses the allocation of a personal box (folder) for each user on a hard disk and the storage of files in such person boxes.

In this personal box are stored various files including files from a host computer, files for facsimile transmission read by a scanner, files received by a facsimile machine, print files generated by print jobs and files from memory cards. The files from the host computer include those to be immediately printed and those to be saved in the person box for printing later on.

Thus, in order to easily select a desired file to perform a job such as printing or transmission, the files themselves have to possess attribute information and a user information database, a job history database and an active job database have to be provided. Accordingly, file management data become complicated, which in return complicates a file management program. Therefore, software development efficiency decreases to elongate a period of development and increase costs.

SUMMARY OF THE INVENTION

An object of the present invention is to provide an image forming apparatus enabling each user to easily select a desired file to perform a specified job with a simpler software configuration even if a great number of files of various types are saved in a large-capacity storage device such as a hard disk.

In order to accomplish this object, one aspect of the present invention is directed to an image forming apparatus, comprising a processor; a storage unit connected to the processor for storing a program and data; a function unit connected to the processor for performing specified functional operations; and an interactive input/output unit connected to the processor, wherein the storage unit includes a plurality of first storage areas set in relation to the functional operations, a plurality of second storage areas related as lower storage areas of the first storage areas and set by the user, and a plurality of third storage areas related as lower storage areas of the second storage areas and set by the file, and the program causes the processor to:

(1) display specified information allotted to the plurality of first storage areas on the interactive input/output unit and display information in the plurality of second storage areas in relation to the first storage area on the interactive input/output unit if one of the first storage areas is selected by the interactive input/output unit, (2) display information of files in the third storage areas included in the second storage area and the names of processes to be performed to the files on the interactive input/output unit if one of the second storage areas is selected by the interactive input/output unit, and (3) perform the process to the file if the file and the process are selected by the interactive input/output unit.

These and other objects, features, aspects and advantages of the present invention will become more apparent upon a reading of the following detailed description and accompanying drawings.

BRIEF DESCRIPTION OF THE DRAWINGS

FIG. 1 is a schematic diagram showing the entire constructions of boxes generated on a hard disk of an image forming apparatus and a removable medium to be attached to the image forming apparatus, and an input/output relationship of files with the boxes.

FIG. 2 is a schematic flow chart showing the process of opening mainly the boxes shown in FIG. 1.

FIG. 8 is a diagram showing a user box unpack screen written with registration dates in a file list.

FIG. 12 is a diagram showing a storage period changing screen.

FIG. 16 is a diagram showing a transmission preparation screen in an address mode.

FIG. 18 is a diagram showing a job box unpack screen of private/suspended jobs.

FIG. 19 is a diagram showing a box unpack screen of a certain user concerning private/suspended jobs.

FIG. 20 is a diagram showing a box unpack screen of a certain user concerning quick/proof & hold jobs.

FIGS. 21A to 21E are diagrams of structures for managing user boxes in a job storage box and files in the user boxes.

FIG. 23 is a diagram showing a complete superimposed form box unpack screen.

FIG. 31 is a diagram showing a facsimile box unpack screen.

FIG. 32 is a schematic block diagram showing the hardware configuration of the image forming apparatus and parts relating thereto.

DETAILED DESCRIPTION OF THE PREFERRED EMBODIMENTS

Figure 3A:
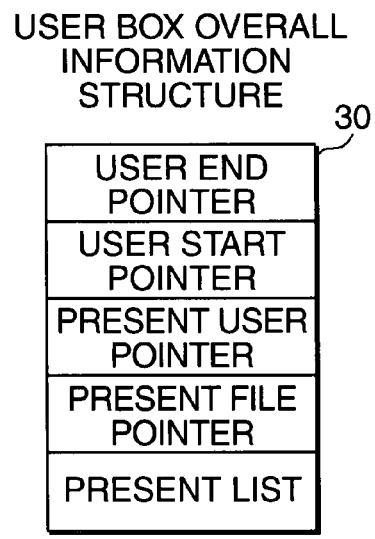
FIGS. 3A to 3C are diagrams of structures for managing user boxes and filed to be saved in these user boxes.

Hereinafter, one embodiment of the present invention is described in detail with reference to the accompanying drawings. FIG. 32 is a schematic block diagram showing the hardware configuration of an image forming apparatus 10 according to the embodiment of the present invention.

In this image forming apparatus 10, an EEPROM (Electrically Erasable Programmable Read Only Memory) 13E1, an EEPROM 13E2, a DRAM (Dynamic Random Access Memory) 13D, an HDD (Hard Disk Drive) 14, an operation panel 15, a scanner 16S, a printer 16P, an NIC (Network Interface Center) 17, a facsimile modem 18 and ports 19, 20 are connected to an MPU (Micro Processing Unit) 11. In FIG. 32, a plurality of interfaces is shown by one block for simplification.

The EEPROMs 13E1, 13E2 are, for example, flash memories. A BIOS (Basic Input Output System) is installed on the EEPROM 13E1. An OS (Operating System), higher-layer service program and application of the OS and a lower-layer device driver of the OS are installed on the EEPROM 13E2. The DRAM 13D is for work area, and the HDD 14 is for data storage.

The operation panel 15 is used to input a set value or instruction for the display of a setting screen or state. In this embodiment, the operation panel 15 is constructed by combining a touch panel and hardware keys.

The scanner 16S is for the input of an image for copying and facsimile transmission. The printer 16P includes a print engine, fixing device, sheeting feeding unit, sheet conveying unit and sheet discharging unit. The printer 16P forms an electrostatic latent image on a photoconductive drum of the print engine based on a supplied bitmap data, develops it with a developer, transfers and fixes the developed image to a sheet, and then discharges the sheet.

The NIC 17 is connected to a host computer 22 via a cable or wireless communication medium and a router 21 and used for print jobs, electronic mail transmission and reception and Internet facsimile transmission. The modem 18 is for facsimile transmission and reception.

A compact flash (registered trademark) memory 24 and a USB memory 25 are respectively connected with the ports 19, 20, and used as file backup memories, recycle bins and removable user boxes.

In the following description, a corresponding handler is started by an event driven method in accordance with the operation of the operation panel 15 by an operator, and the MPU 11 operates in accordance with a given command to perform a process.

FIG. 1 shows a plurality of boxes generated on the hard disk 14 and removable medium 23. Here, the boxes are storage areas logically distinguished from other areas and include, for example, folders and storage areas (virtual folders) on the drive or memory.

If files of images read by the scanner, files of image data carrying out the bitmap decompression in print jobs and facsimile transmission jobs (job files), files of data received from the host computer and the like are collectively stored in a folder of each user, a database for managing the files while distinguishing the types and attributes of the files, and the configuration of a program handling this database become complicated. Further, the version upgrading of some of functions adversely affects other parts, thereby deteriorating program development efficiency. On the other hand, if the number of boxes is increased, such problems can be solved, but it generally takes time for a user to find a desired file, thereby deteriorating operability.

Accordingly, in this embodiment, the boxes are first classified as shown in FIG. 1. Specifically, the boxes are divided into a custom box 26 including boxes of the respective users for document filing which are restricted in direct processing although being used for many use applications, a job storage box 27J including boxes of the respective users for storing print jobs distinguished according to the use applications, and a facsimile (FAX) box 28 including boxes of the respective users in which confidentially received facsimile files are stored. This can avoid the complexity of the data processing configuration of the program and prevent the version upgrading of some functions from largely influencing the other parts, thereby improving program development efficiency. Here, the job storage box 27J represents two job storage boxes 27JP, 27JQ by one box, and the boxes of the respective users are contained in each of these boxes.

In order to avoid a reduction in the operability of users by such division of the boxes and the addition of boxes for other use applications, four main boxes, i.e. the custom box 26, a job box 27, the facsimile box 28 and a facsimile work box 29 are generated on the hard disk 14. These main boxes are folders or virtual folders.

Next, the details of the respective boxes are described. In the custom box 26, the folders of the respective users are generated as boxes (user boxes; sub boxes), and the files of print data, facsimile transmission data or electronic mail transmission data received by an NIC receiver 17R and the files of image data read by the scanner 16S are stored in these boxes. Files from the other boxes excluding those in the facsimile work box 29 can be moved to the user box in accordance with the operation of the user. The user can cause the printer 16P to print, and carry out an electronic mail transmission or Internet facsimile transmission via an NIC transmitter 17T by designating a file in the user box. A normal facsimile transmission is carried out as described later.

A recopy box 27C, an image synthesis box (form box) 27I and the job storage box 27J (these boxes are sub boxes) are generated in the job box 27.

A file (job file) containing a bitmap decompression image data generated by a copy job and attribute data such as a sheet size, a copy density and a post-processing data is stored in the recopy box 27C for recopying after printing. Thereafter, the user designates this file and presses a start key, whereby recopying can be more quickly performed. A file storage period in the recopy box 27C is set as an attribute of the recopy box 27C, and the file is automatically deleted upon the lapse of the storage period.

A group of forms for form overlay are stored in the image synthesis box 27I. This group of forms are files of image data read by the scanner 16S. The image synthesis box 27I can also be a work folder for form overlay, and a job file of an image synthesized by the form overlay is also temporarily stored. This job file is printed by the printer 16P.

A job file obtained by carrying out the bitmap decompression of a print file supplied from the host computer 22 via the NIC receiver 17R based on a designated condition is stored in the job storage box 27J. This file is managed by being classified according to the use application as described later.

Next, facsimile-related boxes are described. The facsimile confidential reception box of each user is generated in the facsimile box 28. The respective confidential reception boxes are related to subaddresses of an F-code communication. The confidential reception box can be opened by entering a corresponding F-code password.

The facsimile work box 29 is used for program work and for preventing the leakage of transmitted and received data, and may be a virtual box in the DRAM 13D unseen by the users. A facsimile transmission box 29T, a facsimile reception box 29R and a facsimile polling transmission box 29P (these boxes are sub boxes) are generated in the facsimile work box 29.

Files of image data of documents read by the scanner 16S or those of image data supplied from the host computer 22 via the NIC receiver 17R are stored in the facsimile transmission box 29T. These image data are facsimile-transmitted via a facsimile modem transmitter 18T after being converted into transmission data by the MPU 11.

An image data received by a facsimile modem receiver 18R is stored in the form of a file in the facsimile reception box 29R. This image data is moved to a box in the facsimile box 28 corresponding to a subaddress in the case of an F-code communication, or is supplied to the printer 16P to be printed unless otherwise.

Image data of documents read by the scanner 16S are stored as transmission files in the facsimile polling transmission box 29P. An image data of a corresponding file is transmitted according to the user's request.

A backup box 24B and a recycle bin 24G are generated on the compact flash memory 24 of the removable medium 23. Here, a data from the NIC receiver 17R can be backed up in the host computer 22, and a data from the scanner 16S can be backed up in the form of a sheet document. Accordingly, only the files in the facsimile reception box 29R except confidentially received ones and the files in the confidential reception box designated by the user in the facsimile box 28 can be automatically backed up in the backup box 24B. The files in the confidential reception box are backed up by being encrypted using the F-code passwords as keys.

Since the hard disk 14 is commonly used by many users, a storage period is set for the files beforehand or set by the users. Upon the lapse of this storage period, this file is moved to the recycle bin 24G.

The USB box 25B is a drive itself or a folder containing a predetermined name in the drive. The USB box 25B is used similarly to the user boxes in the custom box 26, and data can be moved or copied between the user boxes and USB box 25B.

The file in the facsimile confidential reception box can be transferred to the corresponding user box in the custom box 26 in accordance with the designation of the user.

FIG. 2 is a schematic flow chart showing the process of opening the boxes by operating the operation panel 15. When the user designates the main box 26, 27 or 28 of FIG. 1 on the operation panel 15, Step S1, S2, S3 or S4 follows Step S0 in FIG. 2, whereby the designated main box is unpacked to display the group of sub boxes on the operation panel 15.

Figure 6:
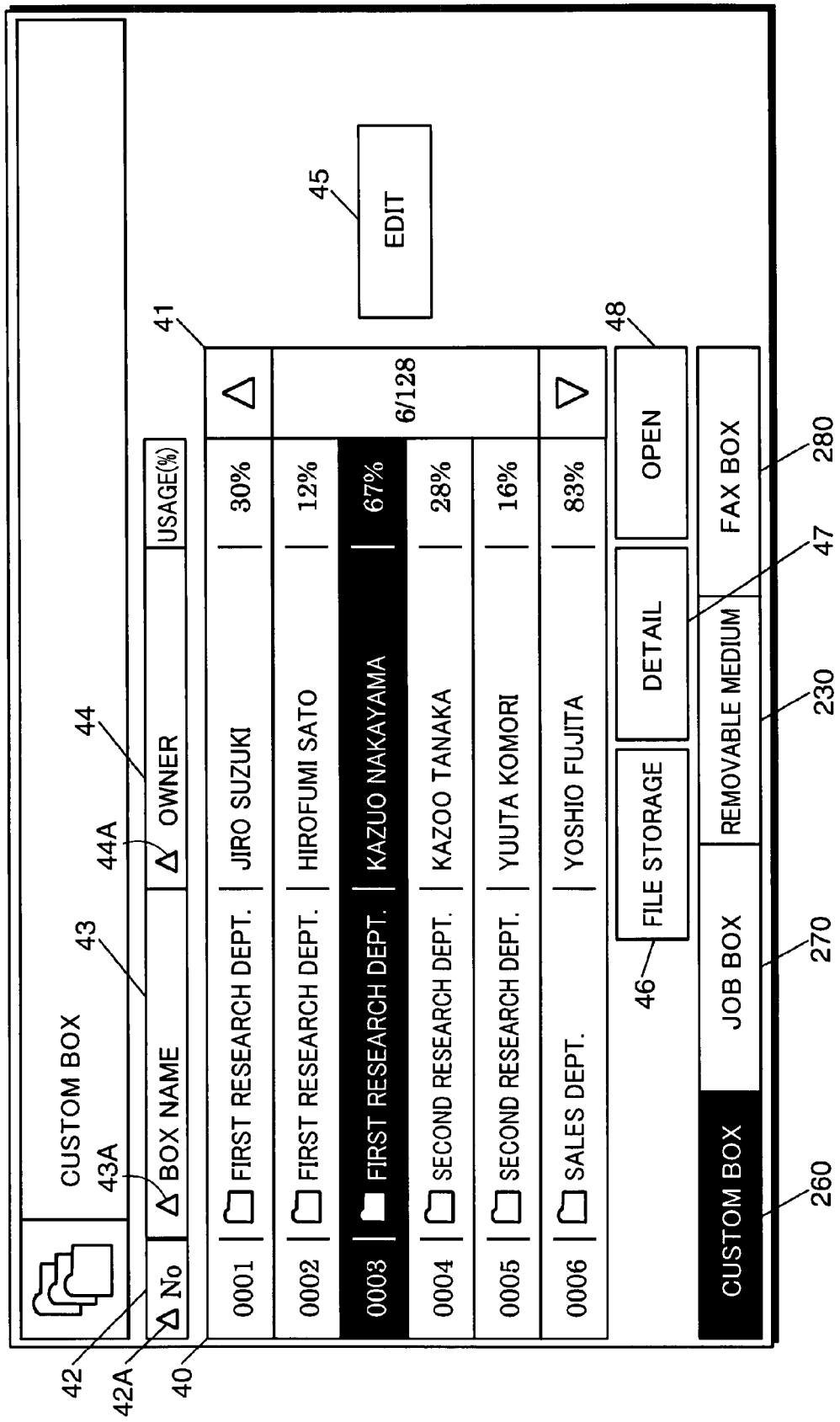
FIG. 6 is a diagram showing a custom box unpack screen.

Specifically, if the custom box is designated on an unillustrated main menu, such a group of user boxes as shown in FIG. 6 are displayed on the operation panel 15. On a sub box display screen immediately below the main box, a custom box button 260, a job box button 270, a removable medium button 230 and a facsimile box button 280 for displaying groups of sub boxes by unpacking the other main boxes are displayed at the bottom of this screen. The button corresponding to the selected main box is highlighted in black-and-white inversion.

Subsequently, when the user designates one sub box, Step S6 follows Step S0 via Step S5 and this box is unpacked to display a group of lower sub boxes or a group of files on the operation panel 15. Specifically, a group of files as shown in FIG. 8 are displayed. Since functions executable for the files are restricted by the selection of the sub boxes, the number of buttons used to select the processing to the files or preparation of the process (setting screen) is relatively small, which provides good operability.

Subsequently, when the user designates the process, Step S8 follows Step S0 via Steps S5 and S7, the process corresponding to the designation or the preparation of the process is carried out.

Here, a data structure for managing the user boxes in the custom box 26 and the files in the user boxes is described. This data structure is generated using models of a user box overall information structure 30, a user structure 31 and a file structure 32 shown in FIGS. 3A to 3C. For the models of the structures 31, 32, these array variables are used.

Figure 3B:
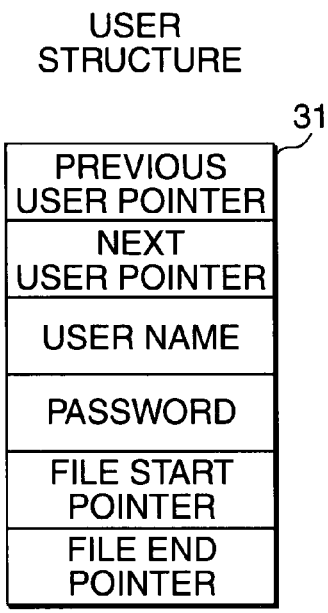
Figure 4:
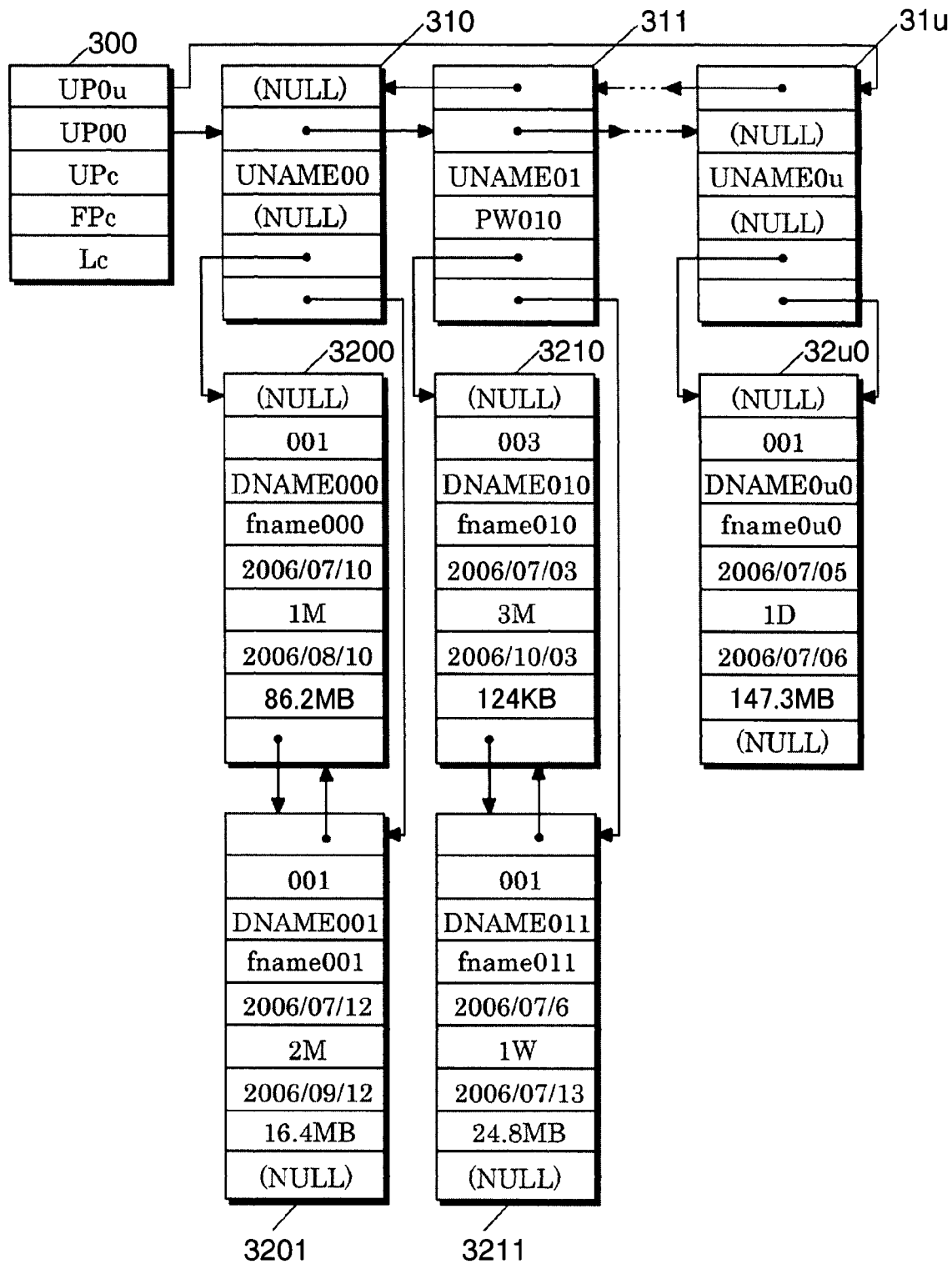
FIG. 4 is a diagram showing a link structure of variables and array variables using structure models of FIGS. 3A to 3C.

FIG. 4 shows a specific example of a list in which variables (cells) of the structure models are connected by pointers. A cell 300 is a variable of the model of the user box overall information structure 30, and cells 310 to 31$u$ constituting a user link list are array variables of the model of the user structure 31. The cells 310 to 31$u$ are bilaterally linked by pointers as shown by arrows, and the cells 310, 31$u$ are respectively pointed by user pointers UP00 and UP0$u$ in the cell 300. (NULL) in FIG. 4 shows a null pointer. As shown in FIG. 3B, the user structure 31 includes a user name and a password for opening the box. The password can be arbitrarily set, and take a NULL value if not being set.

The user structure 31 also includes start pointers and end pointers of the files in the user boxes. As shown in FIG. 4, cells 3200, 3201 are pointed, for example, by the file start pointer and file end pointer of the cell 310. Both the cells 3200 and 3201 constituting the file link list are array elements of the model of the file structure 32 of FIG. 3C, and are bilaterally linked by a previous file pointer and a next file pointer as shown by arrows.

The file structure 32 includes the number of sets to be printed, document name, file name, registration date, storage period, planned deletion date and file size as elements. The registration date is a data on which the file is stored on the hard disk 14; the storage period is a period the user set for each file, and the planned deletion date is a data obtained by adding the storage period to the registration date. With reference to this planned deletion date, the file is automatically deleted if the planned deletion date has already passed on or before today.

Figure 3C:
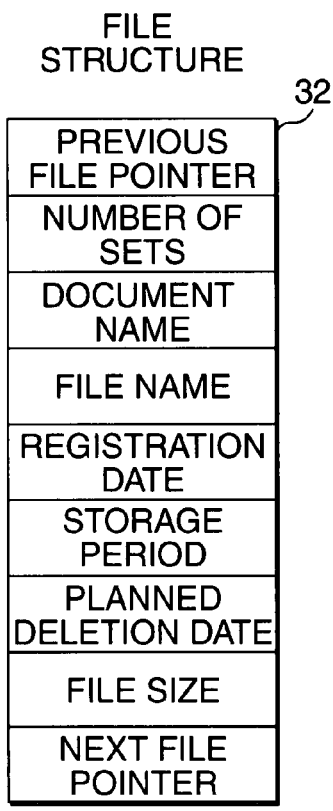

The user box overall information structure 30 of FIG. 3A contains elements of a present user pointer, a present file pointer and a present list in order to conform the link list of FIG. 4 to the present screen. An address is entered in the present user pointer so as to designate a cell having the user name (owner) selected on the screen of FIG. 6, for example, out of the cells 310 to 31$u$. The present list is a flag indicating a user link list ('0') or file link list ('1'), and '0' in this case. Similarly, an address is entered in the present file pointer so as to designate a cell having the user name selected on the screen of FIG. 6, for example, out of the cells 3210 to 3211. In this case, the present list is '1'.

In sorting the user names, the user link list is sorted to change a linking order. In sorting the document names, the file link list of the selected user name is sorted to change a linking order.

The structures, the link lists using the structures, the relationship between the structures and screens and the sorting described as above similarly hold for the other structures, link lists using the other structures, the relationship between the other structures and the screens and the sorting to be described later.

Figure 5:
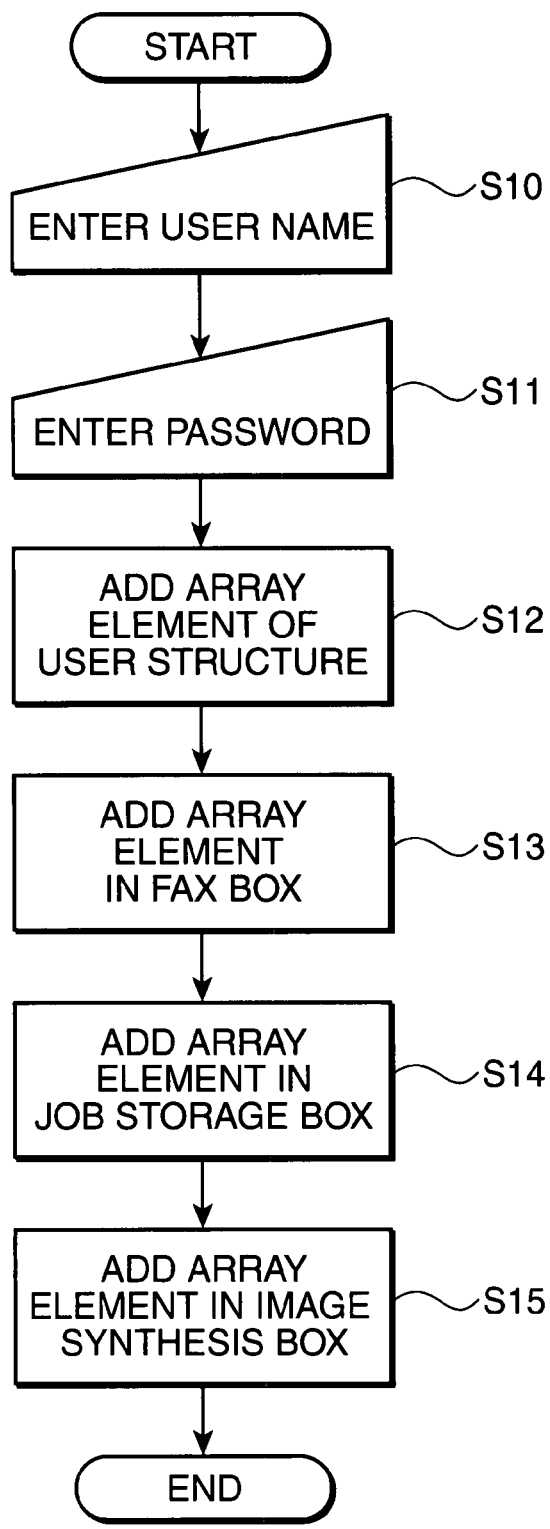
FIG. 5 is a flow chart showing a user box generation process.

FIG. 5 is a flow chart showing a user box generation process carried out on an unillustrated screen displayed upon the depression of an edit button 45 of FIG. 6. The process of FIG. 5 is a part of the process carried out in Step S9 of FIG. 2.

(S10) An operator enters a user name in a text box on the screen. The user name of a user box is the name discriminating an individual or a group such as a department or section.

(S11) The operator enters a password used to open the user box. The following process is carried out by the MPU 11 in response to the depression of a user register button.

(S12) The entered user name and the array element of the model of the user structure 31 for which the password was entered are added to the user link list, and a new user box is generated.

(S13) Operations similar to those in Step S12 are performed for the user link list concerning the facsimile confidential reception box in the facsimile box 28 to be described later.

(S14) Operations similar to those in Step S12 are performed for the user link list concerning the user box in the job storage box 27J to be described later.

(S15) Operations similar to those in Step S12 are performed for the user link list concerning the form files of each user in the image synthesis box 27I to be described later.

As described above, there is no likelihood of increasing burdens on the user even if a plurality of boxes and management data are generated for one user since the other user boxes and their management data are similarly automatically generated upon generating one user box and its management data. By this generation of a plurality of boxes and management data, it can be avoided to complicate the management program of various boxes and the program for processing the files in the boxes, thereby advancing efficiency in the development and improvement of programs.

On the custom box unpack screen of FIG. 6 are displayed a list 40 of the user boxes generated in the custom box 26. At the right end of the list 40 is displayed a scroll bar 41 used to scroll the list 40. At the upper end of the list 40 are displayed the names of the respective columns of the list 40, and buttons 42 to 44 used to sort the respective items of the first to third columns in an increasing or decreasing order. If any of these buttons is pressed as generally used, the corresponding items are sorted in an increasing or decreasing order depending on the facing direction of the button, and a result is displayed in the list 40. Further, if the facing direction of the corresponding one of sorting direction labels 42A to 44A is displayed in an inverted manner and this button is pressed again, the items are sorted in a direction opposite to the previous one.

If one row is selected in the list 40 and the edit button 45 is pressed, a transition is made to an edit screen for a box name and a box owner name of this row, enabling the editing of these.

Figure 7:
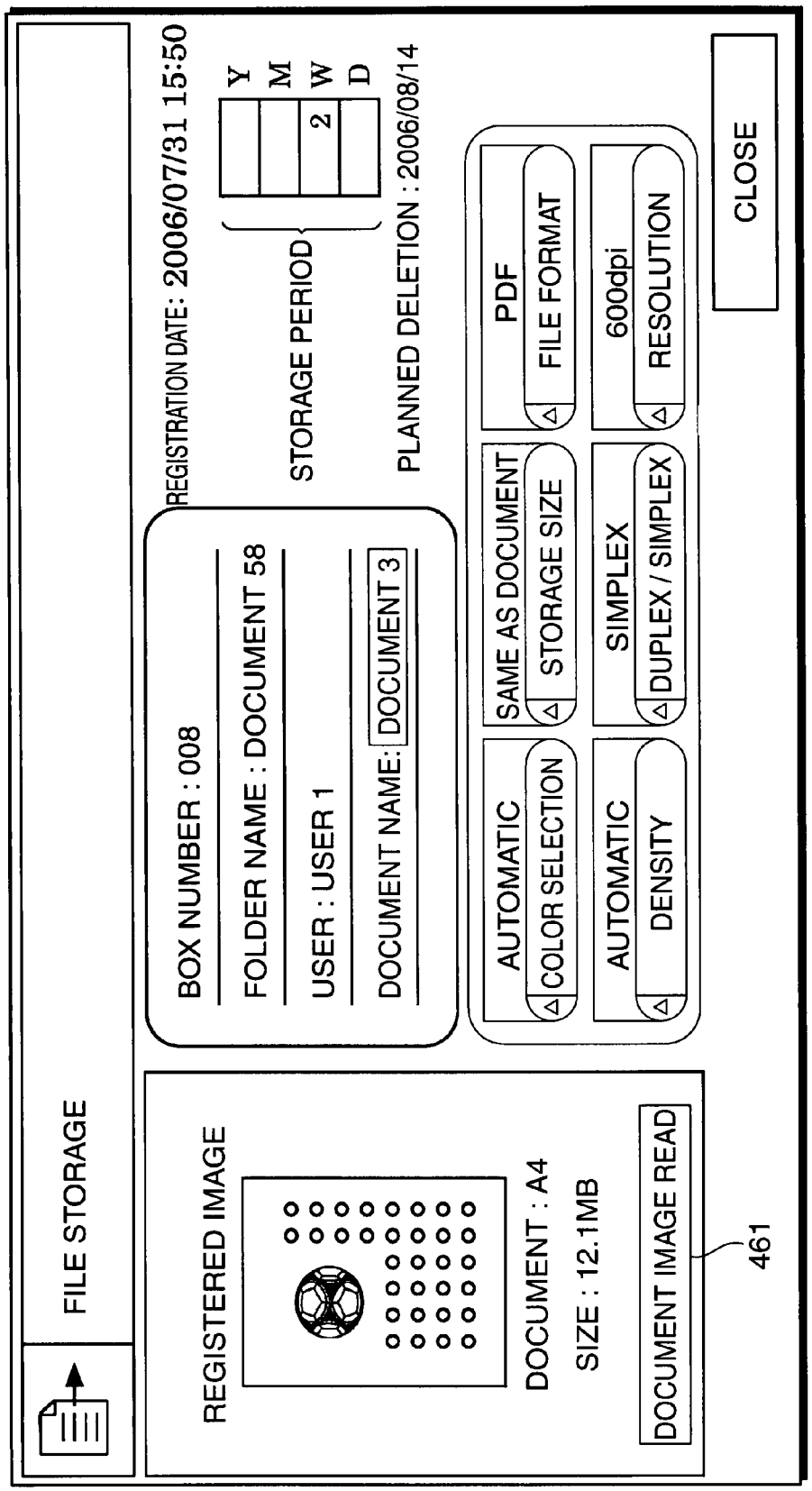
FIG. 7 is a diagram showing a file storage screen.

If a file storage button 46 is pressed, a file storage screen as shown in FIG. 7 is displayed. On this screen, a document name and a file storage period by the year (Y), month (M), week (W) or day (D) are entered in a text box. If no data is entered, the file storage period is set at a predetermined value (or limitless).

If a document image read button 461 is pressed, a document image is read by the scanner 16S. The read file is saved in the box selected in FIG. 6 while a thumbnail thereof is generated and displayed, and the date is displayed as a registration date. The file from the NIC receiver 17R is saved by starting the printer driver in the host computer 22 to display an unillustrated file storage screen, setting the data and pressing the storage button. Upon the file storage, a new cell is added to a file link list corresponding to that of FIG. 4 and the storage period is entered together with the registration date, which is today, in this cell.

If a detail button 47 is pressed, attribute information added to the saved file is displayed. If an open button 48 is pressed, this user box is opened and an image as shown in FIG. 8 is displayed.

Figure 17:
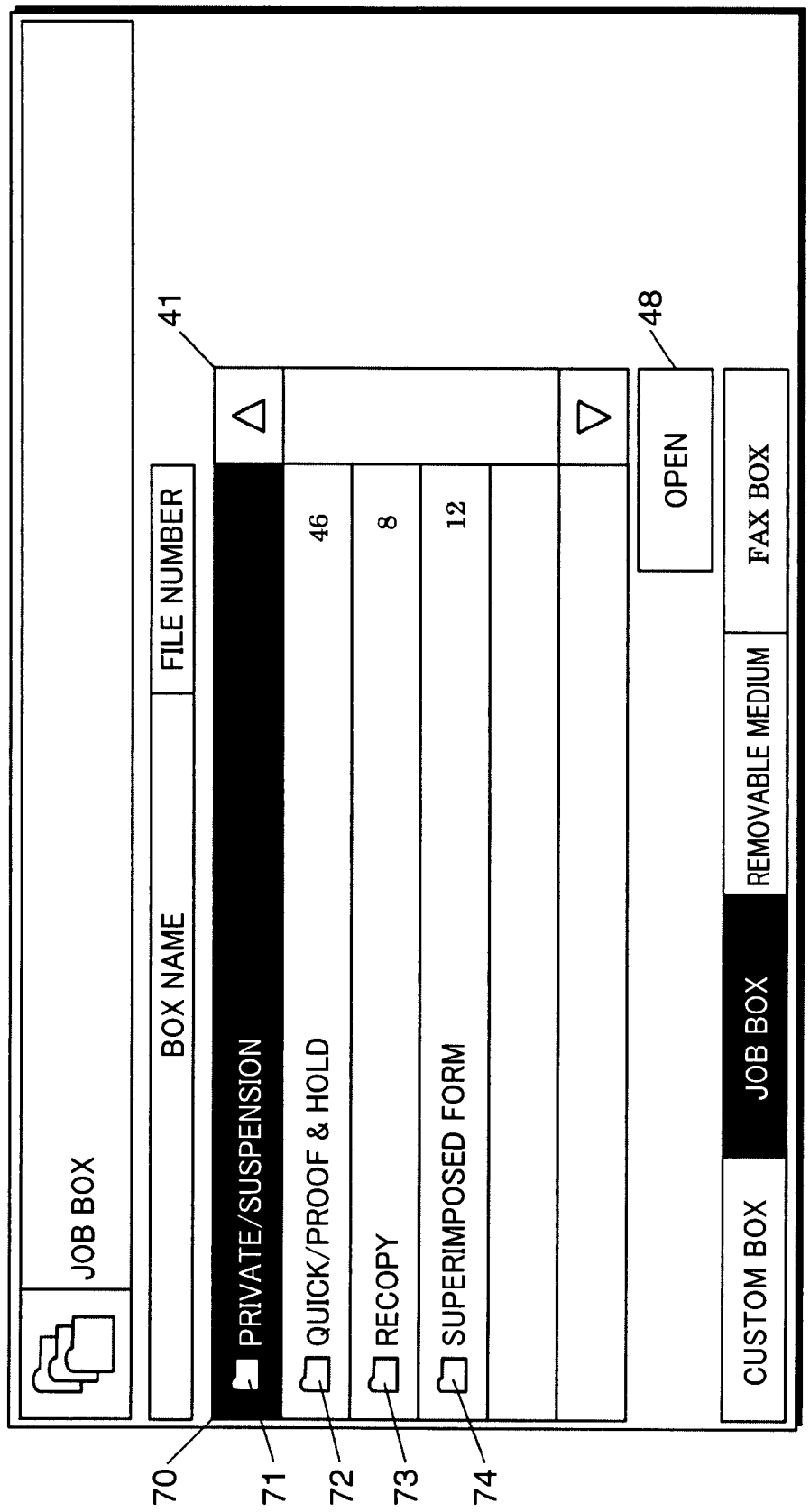
FIG. 17 is a diagram showing a job box unpack screen.
Figure 28:
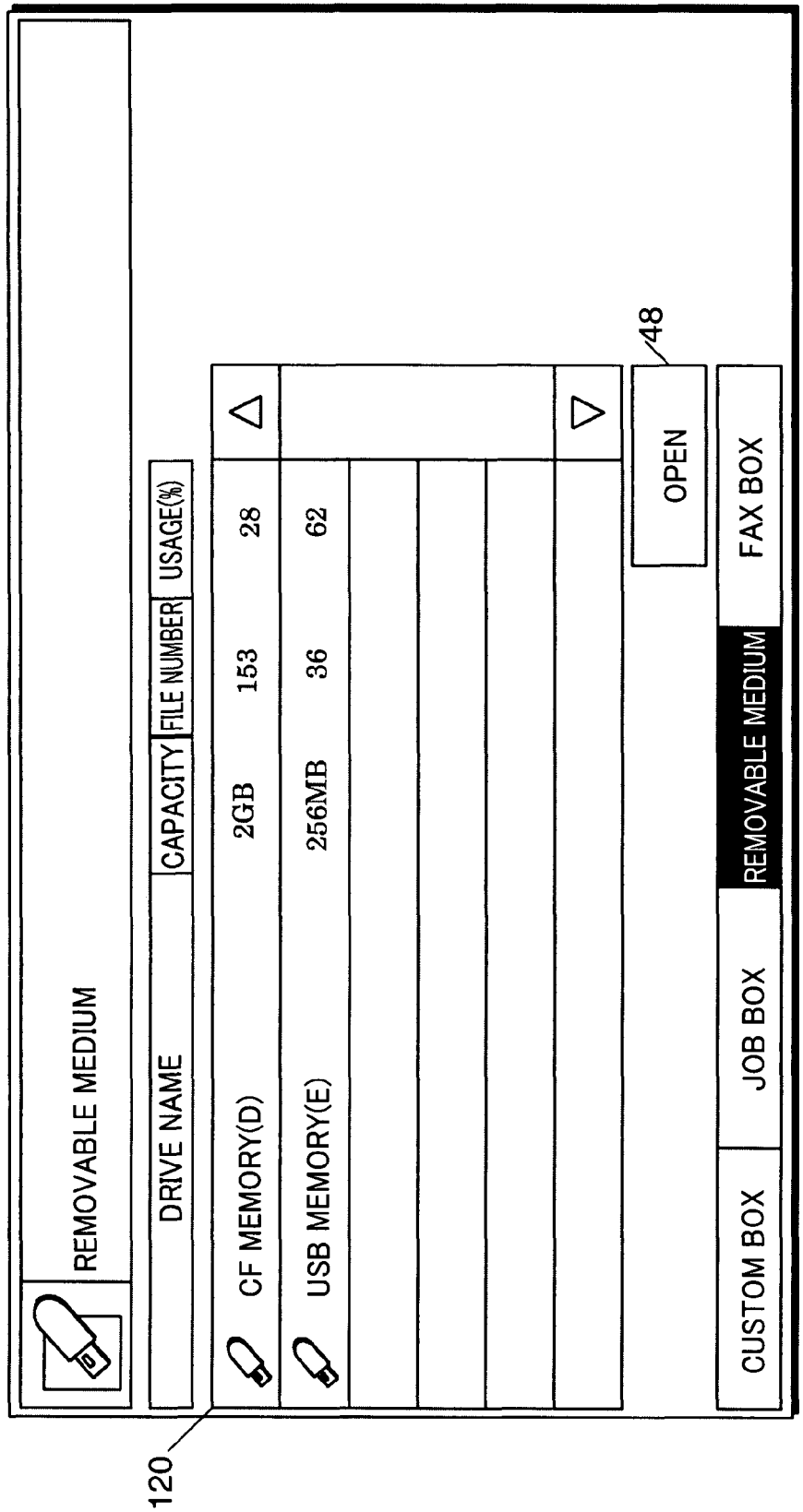
FIG. 28 is a diagram showing a removable medium unpack screen.

A main box unpack screen shown in FIG. 17, 28 or 31 is displayed if the job box button 270, removable medium button 230 or facsimile box button 280 is pressed in FIG. 6.

On a user box unpack screen of FIG. 8, a list 50 is a list of the files stored in the selected user box and contains a column of document names, a column of dates on which the files are registered on the hard disk 14, and a column of file sizes. As in FIG. 6, a scroll bar 41 is displayed at the right end of the list 50, buttons 51 to 53 written with the names of the columns are displayed at the upper end of the list 50, and sorting direction labels 51A to 53A are displayed on the respective buttons 51 to 53. Sorting by pressing any one of the buttons 51 to 53 and corresponding changes in the facing directions of the sorting-direction labels 51A to 53A are as in the case of FIG. 6.

Figure 9:
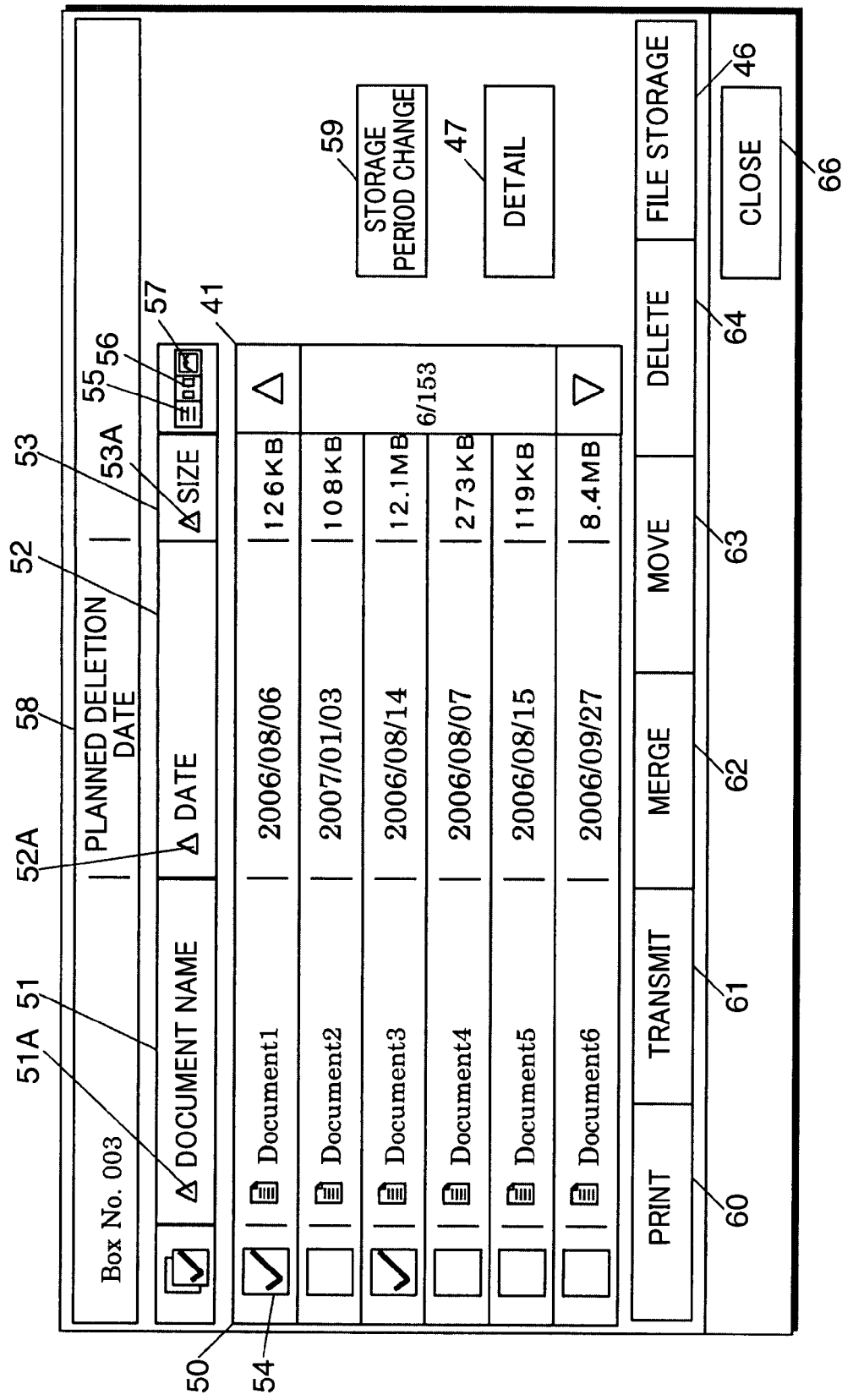
FIG. 9 is a diagram showing a user box unpack screen written with planned deletion dates in a file list.
Figure 10:
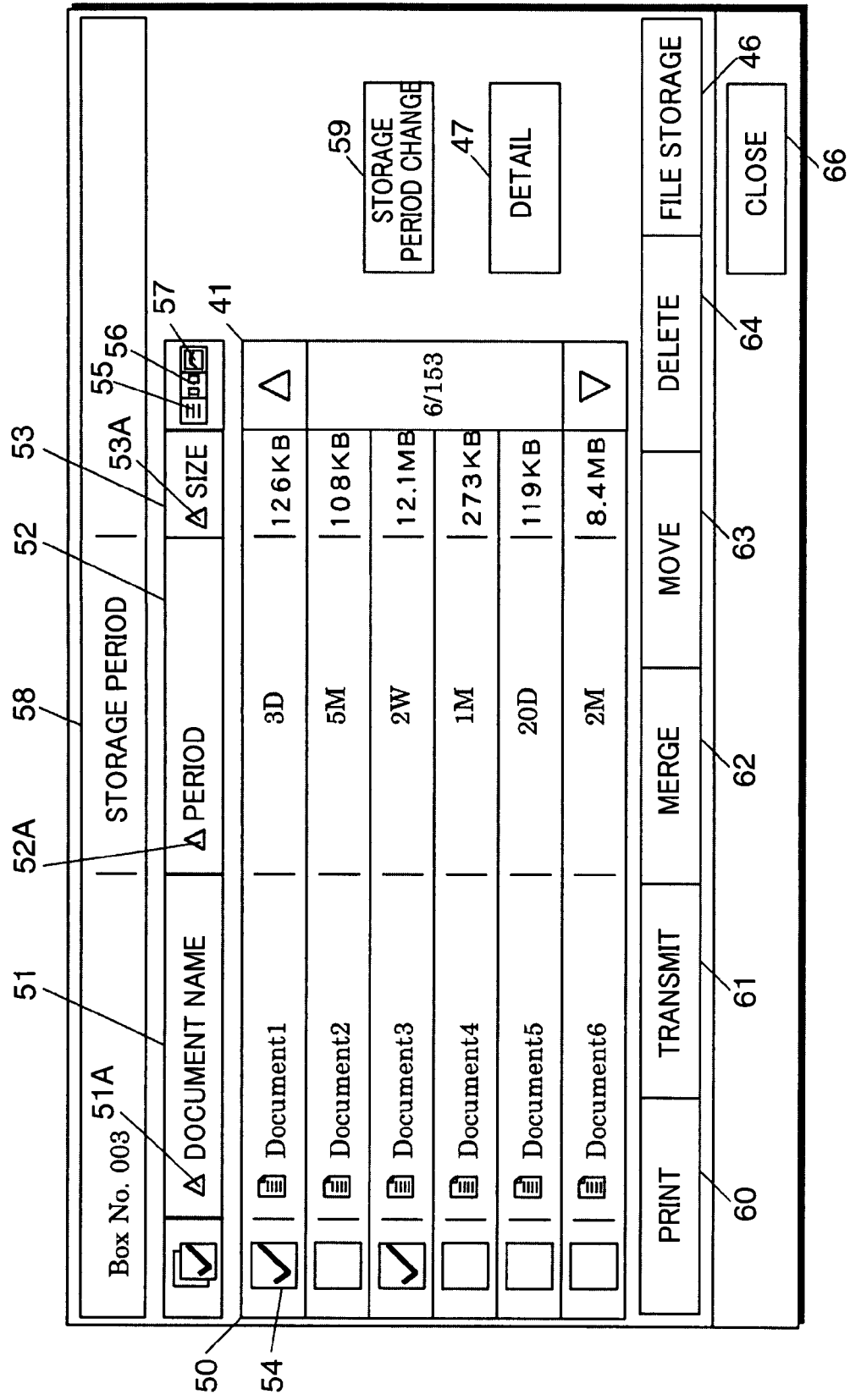
FIG. 10 is a diagram showing the user box unpack screen written with a storage period in the file list.

An item changeover button 58 is displayed right above the sort button 52. Every time this item changeover button 58 is pressed, the display of the sort button 52 changes from "registration date" (FIG. 8) to "planned date of deletion" (FIG. 9) and further to "storage period" (FIG. 10), and the item to be sorted is displayed on the sort button 52 when the item changeover button 58 is pressed.

When the free space on the hard disk 14 becomes too small, which file should be preferentially deleted can be properly and quickly judged based on any one of these items, particularly the planned deletion date, sorting result concerning the file sizes and the document names. Further, for the file whose deletion date is nearing, whether or not the storage period should be extended can be easily judged.

In a column at the left end of the list 50 are displayed check boxes 54. By pressing the inside of the rectangular check box 54, a check mark is added to select the file. By pressing the detail button 47 at the right side of the list 50 or the print button 60, transmission button 61, merge button 62, move button 63 or delete button 64 at the bottom side of the list 50, a transition is made to an unillustrated menu screen and a corresponding process can be performed to the selected file.

Here, "merge" is a process of merging a plurality of document files into one document file, and "move" is a process of moving the file to the USB box 25B. If the file storage button 46 is pressed, the same process as in the case where the file storage button 46 of FIG. 6 is pressed is performed. If the detail button 47 is pressed, the file name, print size, page number of the document, resolution, color/monochromatic printing, data size and file registration date are displayed. If a close button 66 is pressed, this user box is closed to return to the screen of FIG. 6.

Figure 11:
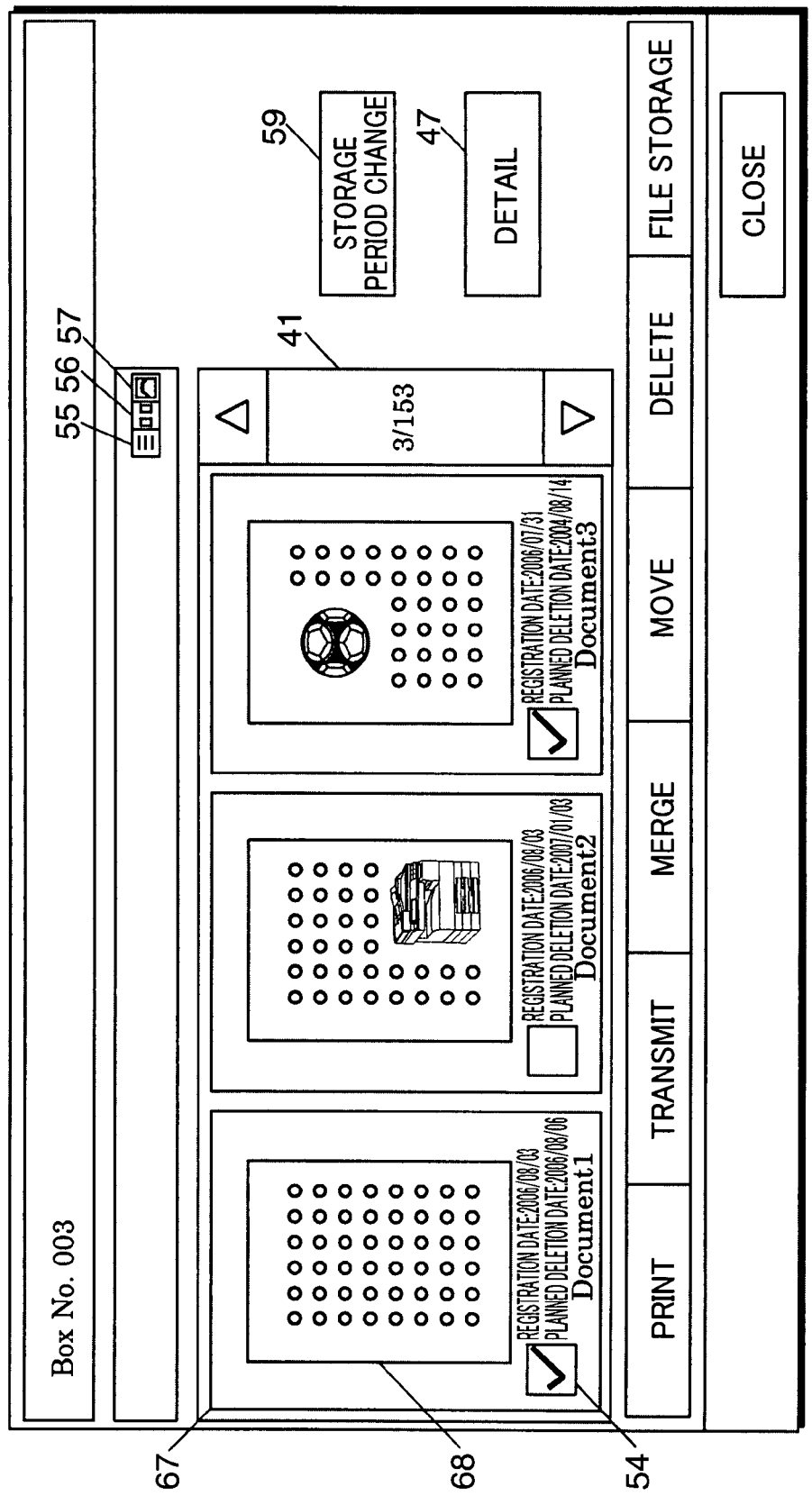
FIG. 11 is a diagram showing a user box unpack screen in a thumbnail display mode.

A list display icon 55, a thumbnail display icon 56 and a preview icon 57 for selecting a method of displaying the information of the files in the user box are displayed at the upper side of the scroll bar 41. The list display icon 55 corresponds to the display mode of FIG. 8. If the thumbnail display icon 56 is pressed, an unpack screen as shown in FIG. 11 is displayed. If the preview icon 57 is pressed, a preview screen corresponding to the selected document file is displayed and a display area can be moved by pressing an unillustrated direction key.

On the screen of FIG. 11, thumbnails 68 are displayed in three frames 67. Each thumbnail 68 is a reduced image of a specified page, e.g. the first page of the corresponding document. Below the thumbnail 68 are displayed a check box, a document name, a registration date and a planned deletion date corresponding to the row of FIG. 8. On this screen as well, the list display icon 55, thumbnail display icon 56 and preview icon 57 are displayed similar to the screen of FIG. 8.

If a storage period changing button 59 of FIG. 8 or 11 is pressed, a screen as shown in FIG. 12 is displayed. The user makes a selection by pressing one of radio buttons "extension", "change" and "unlimited" for the storage period, and a period by the year (Y), month (M) or day (D) at the right side is entered if "extension" or "change" is selected.

Figure 13:
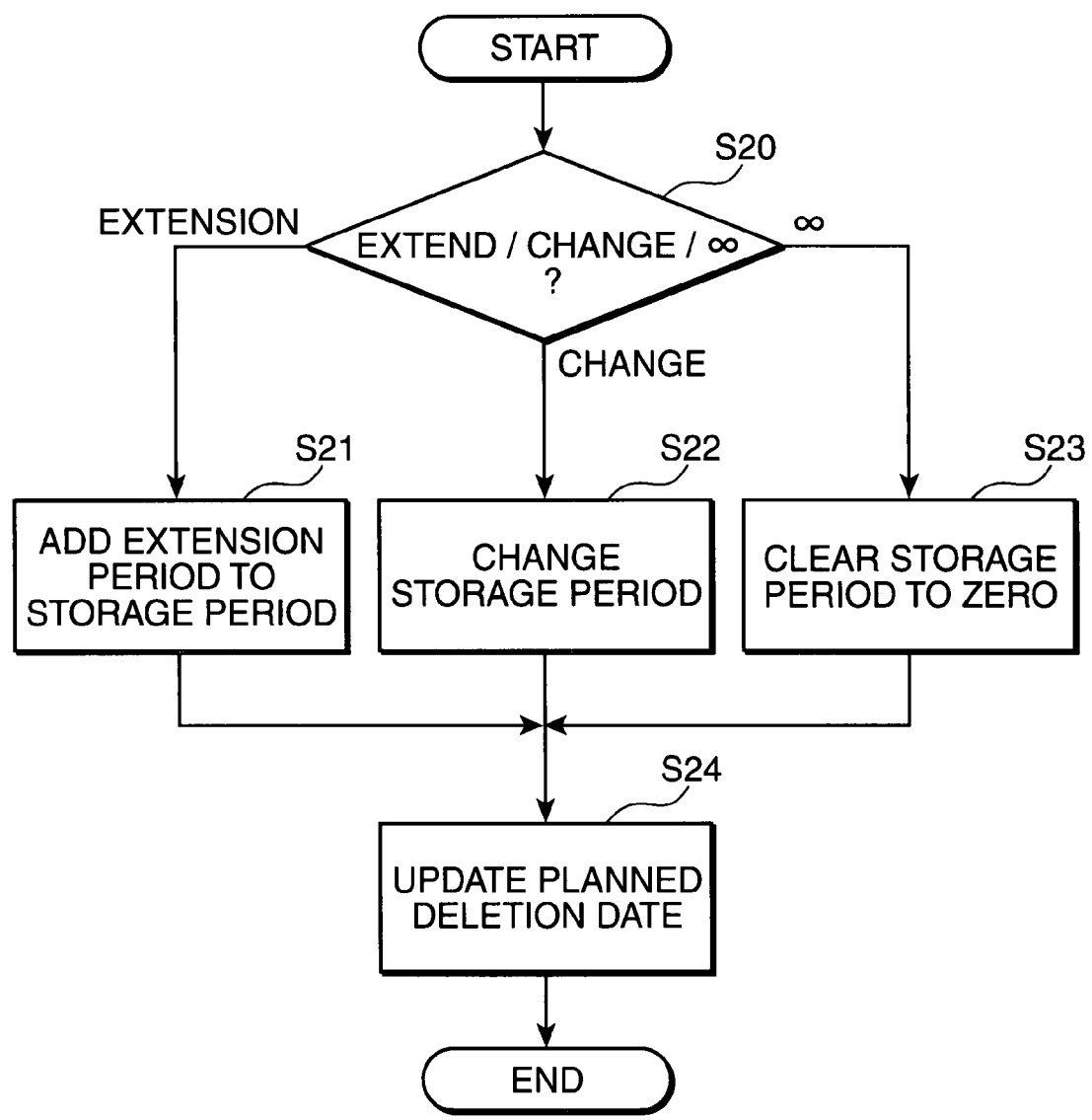
FIG. 13 is a flow chart showing a storage period updating process.

If a confirm button is pressed, a storage period changing process shown in FIG. 13 is started. The process of FIG. 13 is a part of the process in Step S9 of FIG. 9.

(S20) If the extension, change or unlimited duration of the storage period is selected in FIG. 12, Step S21, S22 or S23 respectively follows.

(S21) With reference to the link list structure of FIG. 4, the file link list is followed from the cell indicted by the present user pointer to find out the cell containing the file name selected in FIG. 8 or 11, the entered extension period is added to the storage period and Step S24 follows.

(S22) The corresponding cell is founded in the same manner as in Step S21, the storage period is changed to the entered one, and Step S24 follows.

(S23) The storage period is cleared to zero and Step S24 follows.

(S24) The planned deletion date is changed based on the storage period updated in Step S21 to S23.

Figure 14:
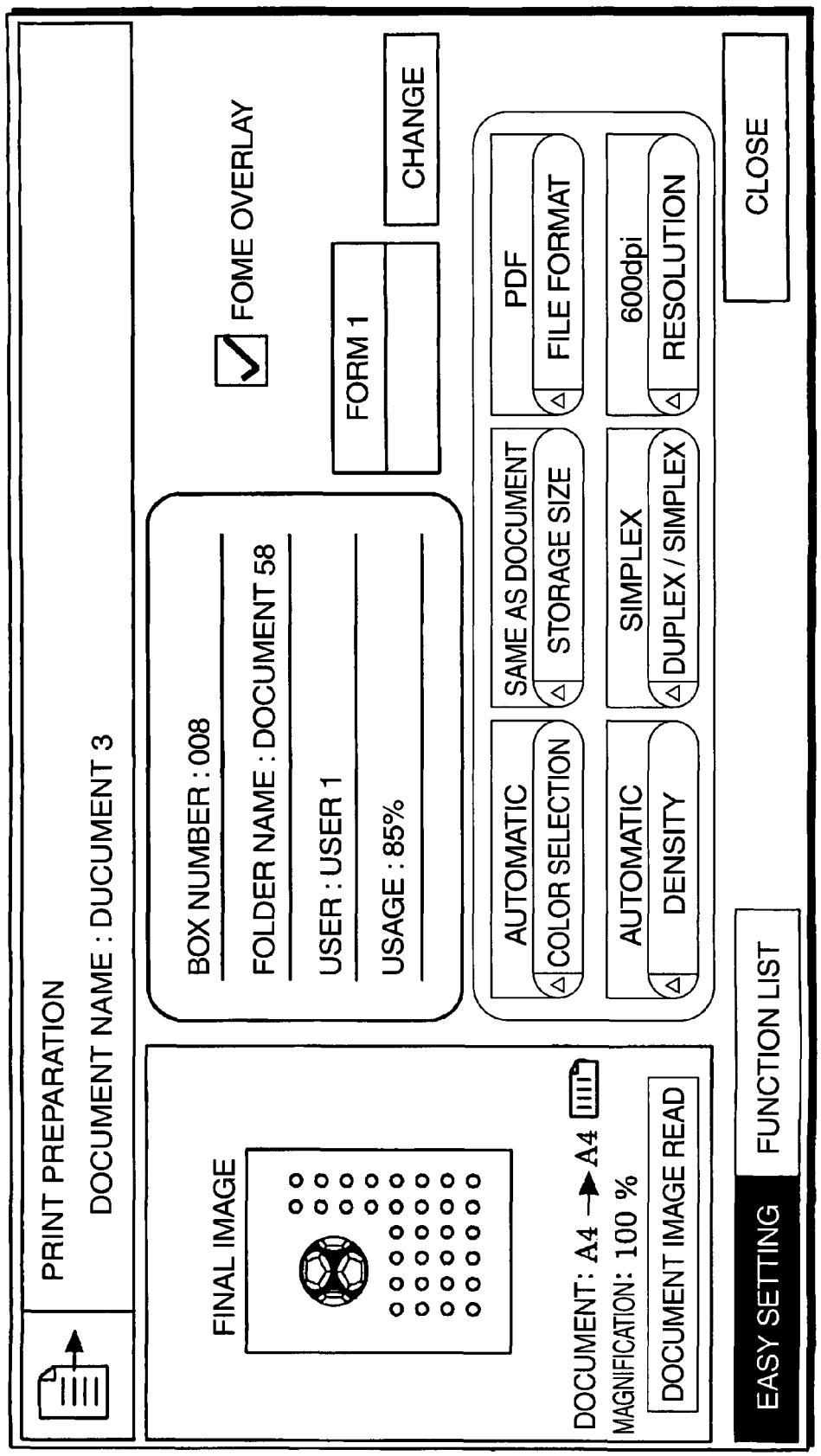
FIG. 14 is a diagram showing a print preparation screen.

Next, if the close button is pressed, the previous screen of FIG. 8 or 11 comes back. If the print button 60 is pressed on the screen in FIG. 8 or 11, a print preparation screen as shown in FIG. 14 is displayed. Printing is described later in connection with forms.

Figure 15:
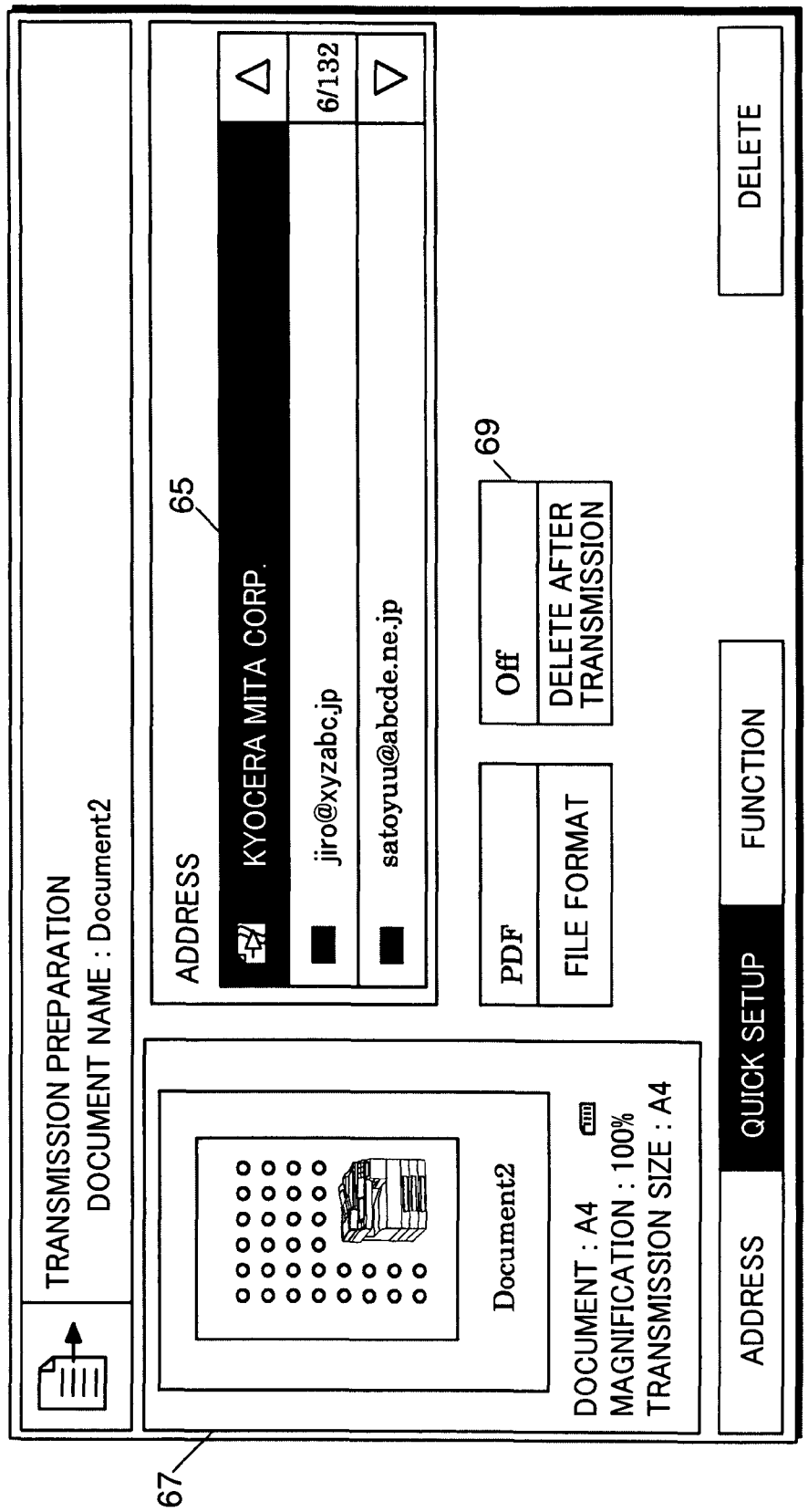
FIG. 15 is a diagram showing a transmission preparation screen in a quick setup mode.

Next, if the transmission button 61 is pressed on the screen of FIG. 8 or 11, a transmission preparation screen of a quick setup mode as shown in FIG. 15 is displayed for the file of the document name selected in the check box 54.

On the left side of this screen are displayed, a thumbnail of the first page of the selected file, a document size, a transmission size and a magnification of the transmission size in relation to the document size. The magnification or transmission size is set on a setting screen (not shown) displayed when a corresponding written part is pressed. On the right side of the screen is displayed an address list 65. In each row of the address list 65 are displayed an icon indicating a facsimile transmission or an electronic mail transmission and the name of the facsimile transmission end or an electronic mail address. A transmission end is selected by pressing one of the rows in the address list 65 and the following process is carried out in FIG. 1 by pressing an unillustrated hardware start key.

Specifically, in the case of an electronic mail transmission, an email transmission routine is invoked and the content of this file is transmitted via the NIC transmitter 17T. In the case of a facsimile transmission, the file is copied in the facsimile transmission box 29T, a facsimile transmission routine is invoked, and this file is facsimile-transmitted to the address via the facsimile modem transmitter 18R after the format thereof is converted into the one for facsimile transmission.

Referring back to FIG. 15, if an on/off toggle button 69 is pressed, a mode to delete and a mode not to delete this file after the transmission are alternately switched. If an address button at the bottom of this screen is pressed, a transmission preparation screen of an address mode as shown in FIG. 16 is displayed.

Next, if the job box button 270 of FIG. 6 is pressed, a job box unpack screen as shown in FIG. 17 is displayed. A private printing/suspended job button 71 and a quick/proof & hold button 72 in rows of a list 70 on this screen respectively correspond to the private/suspended job box 27JP and quick/proof & hold job box 27JQ of FIG. 1. A recopy button 73 and a superimposed form button 74 respectively correspond to the recopy box 27C and image synthesis box 27I of FIG. 1.

The files stored in the respective user boxes in the job storage box 27J are classified into four categories depending on the purposes of the users, and each category is further classified into job groups "private" or "suspension" not to be printed immediately and job groups "quick" or "proof & hold" to be printed immediately. Here, "private" means printing at a later time, but deletion immediately after printing for the preservation of confidentiality. "Suspension" means suspension for later printing or transmission and further suspension after printing or transmission. "Quick" means immediate printing of a specified number of sets. "Proof & hold" means printing of only one part at first, and correction according to the reading result of this page or printing of the remaining part.

If the private printing/suspended job button 71 is selected and pressed and the open button 48 is pressed, a private/suspended job unpack screen shown in FIG. 18 is displayed. In each row of a list 80 on this screen are displayed a user name and the number of files in the box. If one of the row in the list 80 is selectively pressed and the open button 48 is pressed, an unillustrated user authentication screen is displayed and a transition is made to a screen of FIG. 19 after the user authentication if user authentication is not carried out yet, whereas a transition is directly made to the screen of FIG. 19 if the user authentication is already carried out.

A list 90 on the screen of FIG. 19 contains documents in a certain user box in the private/suspended job box, and is displayed as in FIG. 8. This list 90 differs from that of FIG. 8 in including a column of check boxes corresponding to a flag P for distinguishing whether or not the job is a private job or storage job. Jobs displayed with check marks by pressing the check boxes indicate a "private" mode and the other jobs indicate a "suspension" mode.

The user can perform the printing process using this screen as in the case of FIG. 8. A point of difference from the case of FIG. 8 is that the document can be quickly printed or transmitted since setting for a print job is already carried out to store the data in the job file.

Referring back to FIG. 17, the quick/proof & hold button 72 is selectively pressed and the open button 48 is pressed, an unpack screen of the quick/proof & hold job box shown in FIG. 20 is displayed.

The screen in FIG. 20 is identical to that of FIG. 19 except that the check box column of the flag "P" of FIG. 19 is replaced by a check box column of a flag "Q" in a list 100. Jobs displayed with check marks in this check box list indicate a "quick" mode and the other jobs indicate a "proof & hold" mode. If the print button 60 is pressed, a process as in the case of FIG. 19 is performed.

Next, a data structure for managing the user boxes in the job storage box 27J and the files in the user boxes is described. This data structure is generated using models of a user box overall information structure 130, a user structure 131 and a job structure 132 concerning the private/suspended jobs, and a user structure 133 and a job structure 134 concerning the quick/proof & hold jobs. For the models of the user structures 131, 133 and job structures 132, 134, array variables thereof are used.

Figure 22:
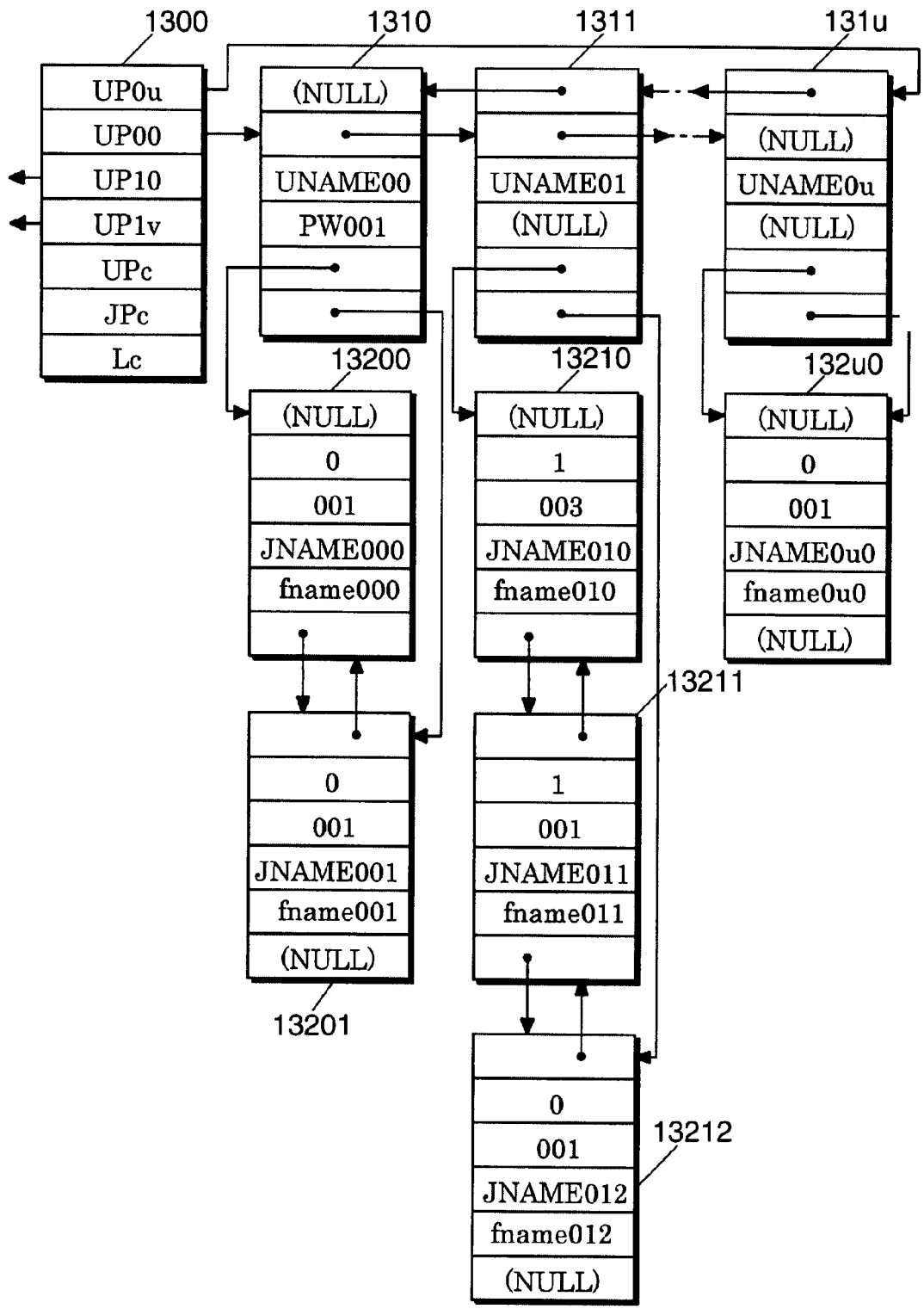
FIG. 22 is a diagram showing a link structure of variables and array variables using structure models of FIGS. 21A to 21E.

FIG. 22 shows a specific example of a list in which the variables of the structure models concerning the private/suspended jobs are linked by pointers.

A cell 1300 is a variable of the model of the user box overall information structure 130, and cells 1310 to 131$u$ are array variables of the model of the user structure 131. The cells 1310 to 131$u$ are bilaterally linked by pointers as shown by arrows, and the cells 131$u$ and 1310 are respectively pointed by a user end pointer UP0$u$ and a user start pointer UP00 in the cell 1300. As shown in FIG. 21B, the user structure 131 includes a user name and a password used to open the box. The password can be arbitrarily set and takes a NULL value unless being set.

The user structure 131 also includes a start pointer and an end pointer of a job file in the user box. As shown in FIG. 22, cells 13200 and 13201 are respectively pointed, for example, by a job file start pointer and a job file end pointer of the cell 1310. The cells 13200 and 13201 are array elements of the model of the job structure 132 of FIG. 21C, and are bilaterally linked by a previous job file printer and a next job file pointer as indicated by arrows. The job structure 132 includes a storage mode, the number of sets to be printed, a job name and a job file name as elements. The above flag "P" is stored in the storage mode.

Although not shown, links by pointers between the variables of the structure model concerning the quick/proof & hold jobs is as in FIG. 22. Cells at a terminus end and a starting end of the user link list of the model of the user structure 133 are linked with a user end pointer UP1$v$ and a user start pointer UP10 in the cell 1300, and cells at a terminus end and a starting end of a job file link list of the model of the job structure 134 are linked with the respective cells of the user link list. The user structure 133 differs from the user structure 131 in including no password, and the job structure 134 differs from the job structure 132 in including the storage period and storing the above flag "Q" in the storage mode.

Referring back to FIG. 17, a screen similar to that of FIG. 8 is displayed if the recopy button 73 is selectively pressed and the hardware start key is pressed. If the superimposed form button 74 of FIG. 17 is pressed, an unpack screen of complete superimposed form boxes as shown in FIG. 23 is displayed.

A list 110 on this screen includes columns of check boxes corresponding to a flag indicating the selection or non-selection of the form, form names corresponding to form files, and form sizes. If the file storage button 46 is pressed, a transition is made to a screen for storing a data read by the scanner 16S of FIG. 1 as a form file in the image synthesis box 27I. A check mark is added to the check box by selectively pressing one of the rows in the list 110. If the delete button 64 is successively pressed, the file of the selected form is deleted to update the display of the list 110. If the close button 66 is pressed, the screen of FIG. 17 or 14 before the transition to this screen comes back.

Figure 26A:
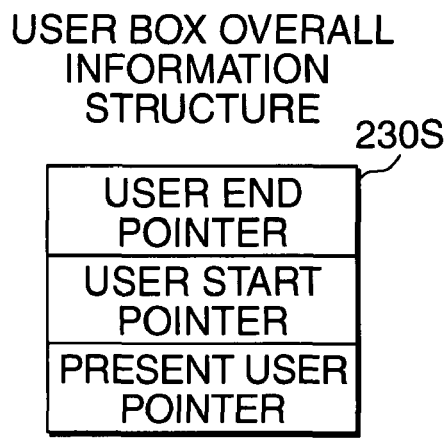
FIGS. 26A to 26C are diagrams of structures for managing user boxes in an image synthesis box and form files in the user boxes.

Here, a data structure for the management of the superimposed form files is described. This data structure is generated using models of a user box overall information structure 230S, a user structure 231 and a form structure 232 shown in FIGS. 26A to 26C. For the user structure 231 and form structure 232, array variables thereof are used.

Figure 26B:
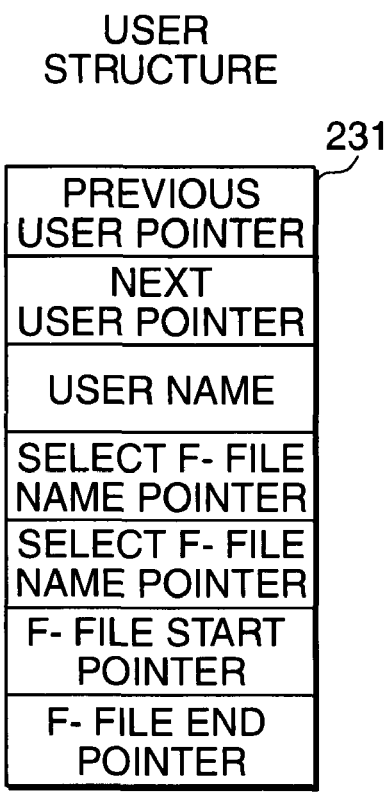
Figure 26C:
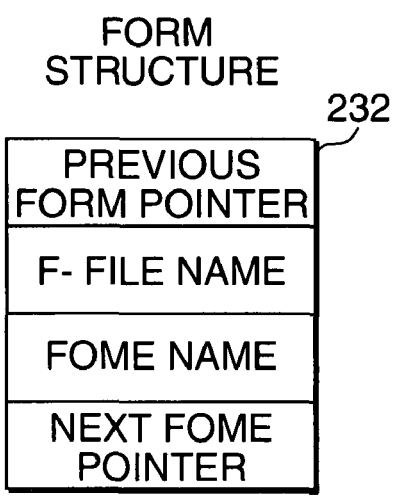
Figure 27:
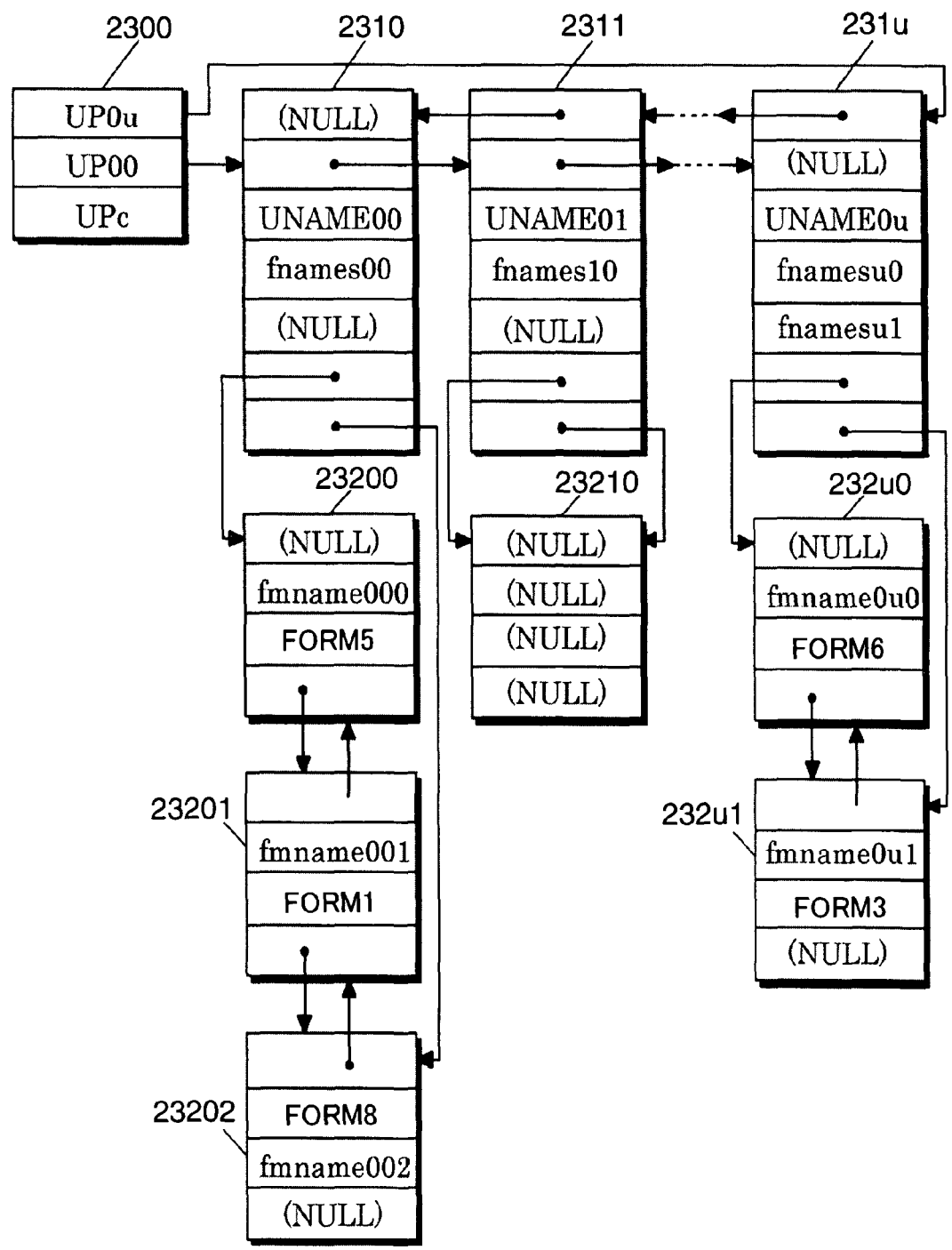
FIG. 27 is a diagram showing a link structure of variables and array variables using structure models of FIGS. 26A to 26C.

FIG. 27 shows a specific example of a list in which the variables of the structure models are linked by pointers. A cell 2300 is a variable of the model of the user box overall information structure 230S, and cells 2310 to 231$u$ are array variables of the model of the user structure 231. The cells 2310 to 231$u$ are bilaterally linked by pointers as shown by arrows, and the cells 231$u$ and 2310 are respectively pointed by a user start pointer UP00 and a user end pointer UP0$u$ in the cell 2300. As shown in FIG. 26B, the user structure 231 includes a user name and pointers corresponding to two or less form file names selected by this user.

The user structure 231 also includes a start pointer and an end pointer of a form file of each user. As shown in FIG. 27, cells 23200 and 23202 are respectively pointed, for example, by a form file start pointer and a form file end pointer of the cell 2310. The cells 23200 and 23202 are array elements of the model of the form structure 232 of FIG. 26C, and are bilaterally linked by a previous form file printer and a next form file pointer as indicated by arrows. The form structure 232 includes a form name and a form file name as elements.

By such links, only the forms used by the operating user can be displayed in the user form mode in FIG. 23. Since the pointers of the two or less form file names of the user structure 231 indicate the selected form file name in the form file link list, the selected form is saved for each user.

Figure 25:
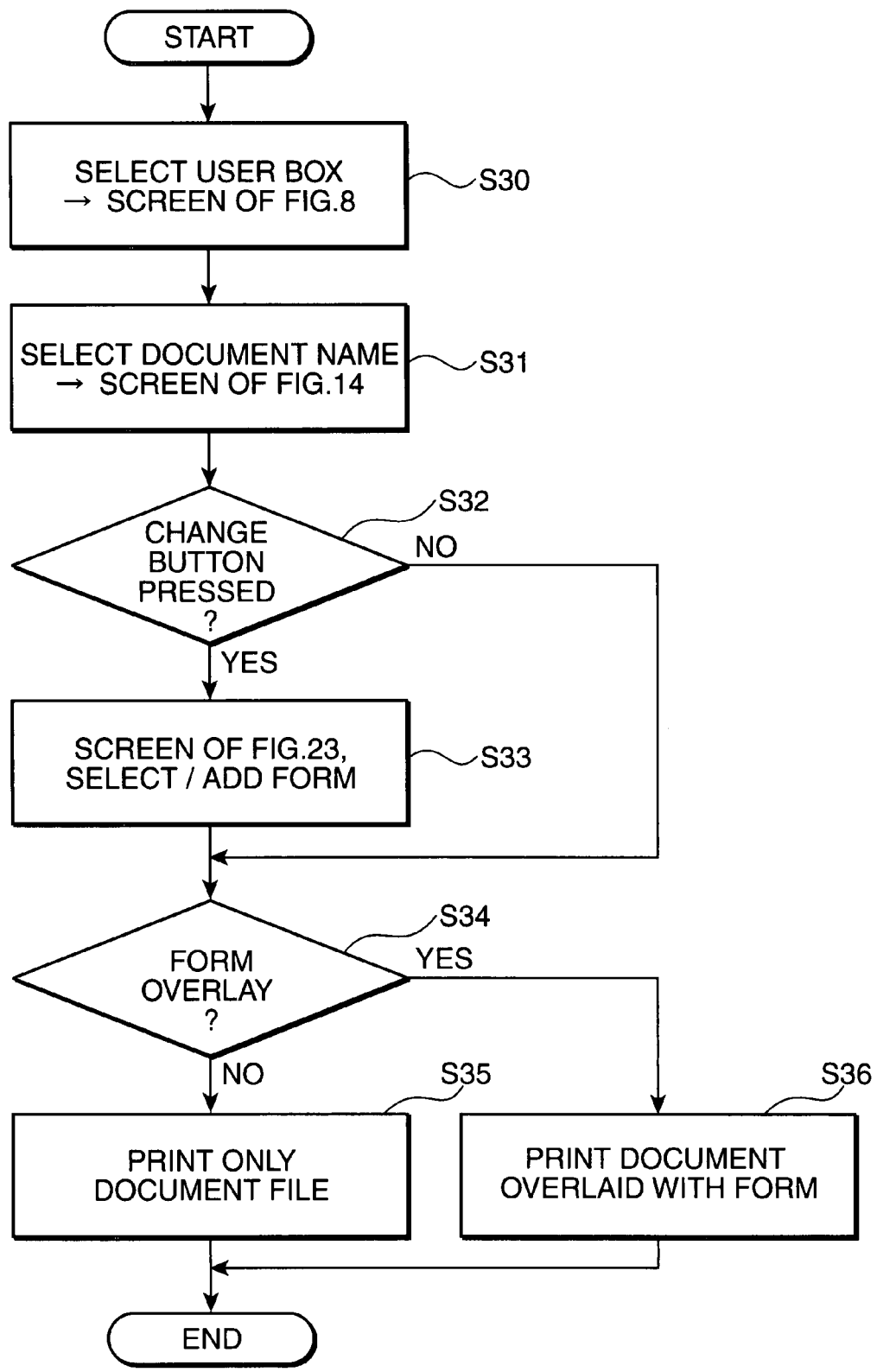
FIG. 25 is a flow chart showing a form overlay printing process.

FIG. 25 is a flow chart showing a form overlay printing process.

(S30) If the user selects the user box on the screen of FIG. 6 and presses the open button 48, a transition is made to the screen of FIG. 8 accordingly.

(S31) If the user selects the document name and presses the print button 60, a transition is made to the screen of FIG. 14 accordingly. On this screen are displayed one or two selected form names saved for the operating user (user of the user name written in the cell pointed by the present user pointer UPc of FIG. 4).

(S32) Step S33 follows if the change button is pressed on the screen of FIG. 14, whereas Step S34 follows unless otherwise.

Figure 24:
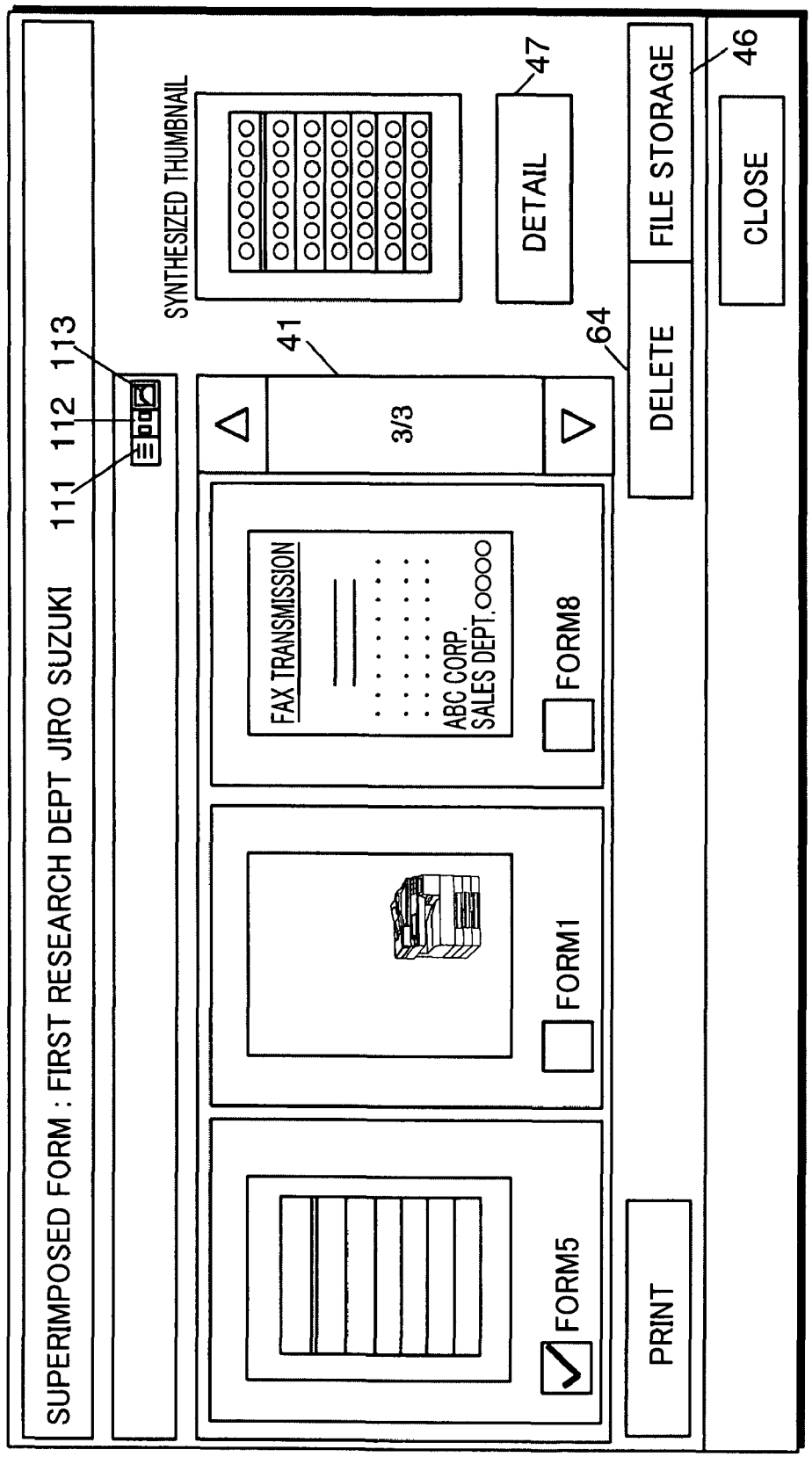
FIG. 24 is a diagram showing a user form box unpack screen.

(S33) A transition is made to a user form mode screen of FIG. 24. On this screen, the user presses the file storage button 46 to display an unillustrated file storage screen, enters the form name, presses the read button to let an image data read from the scanner 16S of FIG. 1, and stores the read image data as a form file in the image synthesis box 27I. If the register button is subsequently pressed, this form name and a thumbnail thereof are added to the screen of FIG. 24.

If a complete form icon 111 above the scroll bar 41 in FIG. 24 is pressed, a transition is made to the screen of FIG. 23 to display all the forms in the list 110 (complete form mode). If a user form icon 112 in FIG. 23 is pressed, a transition is made to the screen of FIG. 24. If a preview icon 113 is pressed, a part of an image of one selected form is displayed, and the other part can be also displayed if a direction key is operated on this screen.

In the complete form mode, the check boxes on the left side of the list 110 are marked for the form names related to this user name. In this state, the user adds a mark by pressing a new check box or delete a mark by pressing the marked check box. In response to this, a cell corresponding to this check box is added to or deleted from the file link list lined with the cell having this user name in FIG. 27. If the user form icon 112 is pressed in this state and a transition is made to the screen of FIG. 24, the form name after the updating for this user name is displayed as a thumbnail.

If a check box below the thumbnail is pressed to be marked, the corresponding form name is selected. In response to this selection, an address of the cell having this form name in the form link list is entered in a selection form pointer in the cell having the user name in the user link list of FIG. 27.

If the detail button 47 is pressed, a thumbnail of an image obtained by synthesizing the selected document and selected form is displayed above the detail button 47 as shown in FIG. 24.

(S34) Step S35 follows unless the form overlay check box is marked in FIG. 14, whereas Step S36 follows if it is marked.

(S35) If the hardware start key is pressed, only the document file is printed.

(S36) If the hardware start key is pressed, an image overlaid in the form of the form name displayed on the screen of FIG. 14 is generated for each of one or more files selected on the screen of FIG. 8 or 11 and the printing process is performed for this file.

Figure 30:
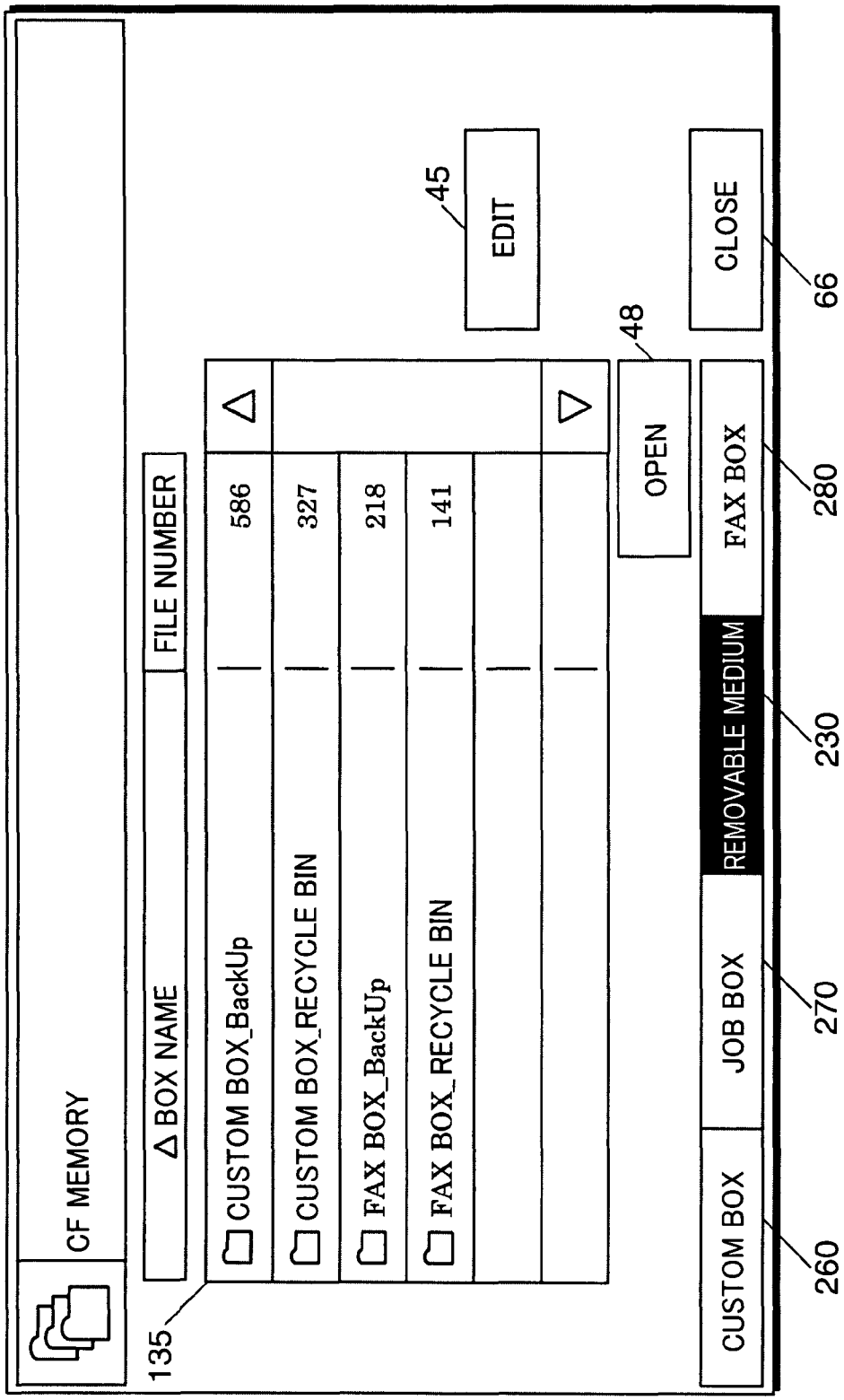
FIG. 30 is a diagram showing a compact flash memory unpack screen.

Subsequently, if the removable medium button 230 is pressed on the screen of FIG. 6 or 17 displaying a main box selection button, a removable medium unpack screen as shown in FIG. 28 is displayed. In a list 120 on this screen are displayed columns of drive names, storage capacities of the drives, and file numbers in the drives and storage area usage rates (%) of the drives. In this embodiment, a CF memory and a USB memory are used as removable media, and an unpack screen as shown in FIG. 30 is displayed if the CF memory is selected and the open button 48 is pressed.

A list 135 on this screen includes columns of box names and file numbers in these boxes. A backup box and a recycle bin are generated for the main boxes and the sub boxes in FIG. 1. They are generated on an unillustrated screen displayed when the edit button 45 is pressed. In the example of FIG. 30, the backup box and recycle box for the custom box 26 and those for the facsimile box 28 are generated.

If one row of the list 135 is selected and the open button 48 is pressed, a screen similar to that of FIG. 8 is displayed for the selected box. On this screen, the file can be moved from the backup box or recycle bin to the corresponding user box in the custom box 26 or facsimile box 28. If the close button 66 is pressed, the screen of FIG. 28 comes back.

Figure 29:
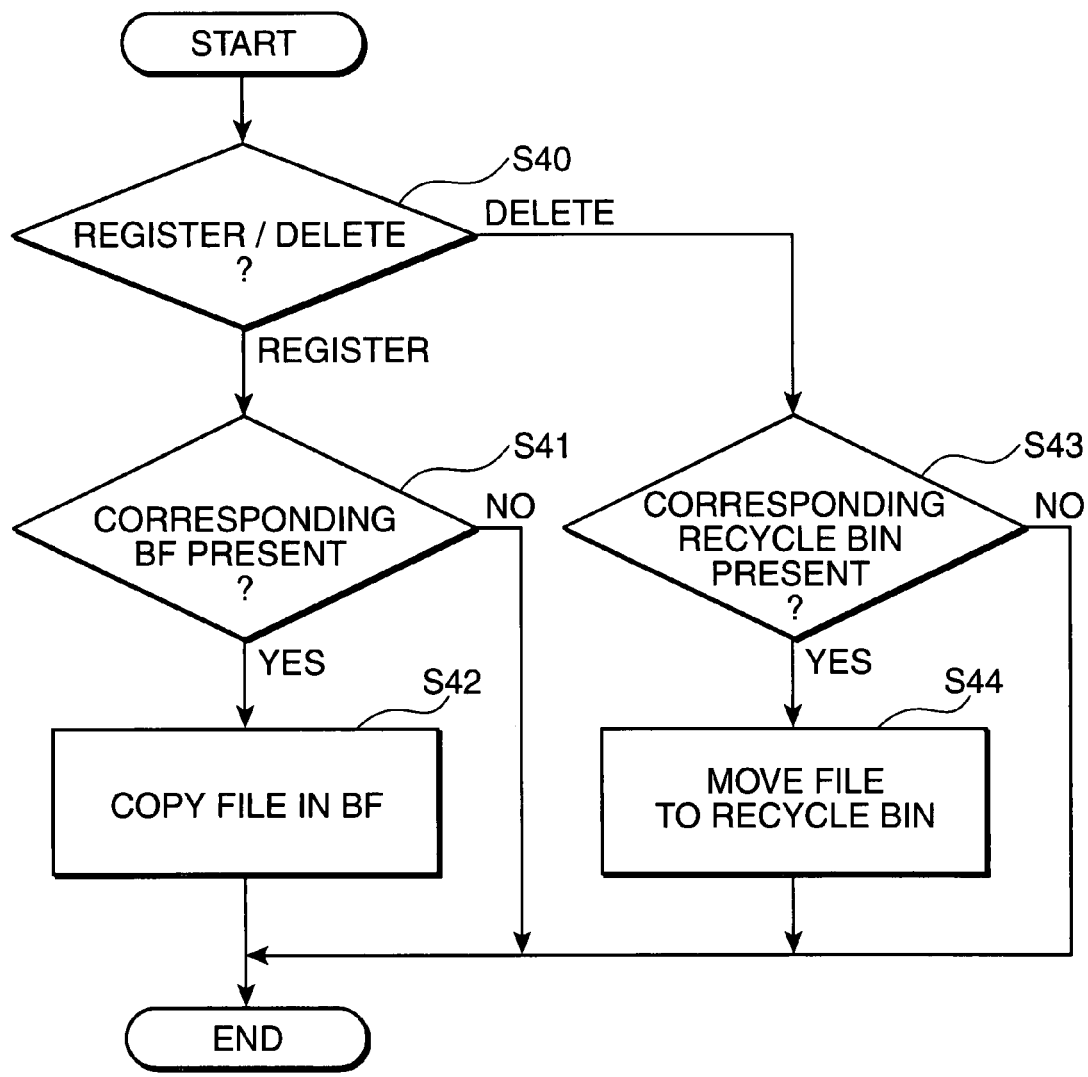
FIG. 29 is a flow chart showing the process of making a backup copy of a file or moving the file to a recycle bin when a register button or a delete button is pressed for the file.

FIG. 29 is a flow chart showing the process of automatically generating a backup copy of the file or automatically moving the file to the recycle bin when the register button or delete button of the file is pressed.

(S40) Step S41 follows if the register button is pressed, whereas Step S43 follows if the delete button is pressed.

(S41, S42) If any folder having a folder name containing the corresponding box name in the compact flash memory 24 and the characters of backup in a specified format is generated in the removable medium 23, the registered or generated file is copied in this backup box.

(S43, S44) If any folder having a folder name containing the corresponding box name in the compact flash memory 24 and the characters of recycle bin in a specified format is generated in the removable medium 23, the file to be deleted is moved to the recycle bin instead of being deleted.

If the facsimile box button 280 is pressed on the screen of FIG. 6 or 17 displaying the main box selection buttons, a facsimile box unpack screen shown in FIG. 31 is displayed.

This screen is similar to that of FIG. 6 and differs therefrom in not having the edit button 45 and file storage button 46 of FIG. 6. The edit button 45 is not provided because a corresponding confidential reception box is generated in the facsimile box 28 if a user box is generated in the custom box 26. The file storage button 46 is not provided because the FAX confidential box is a reception box and FAX transmission is performed by designating a file in the user box in the custom box 26.

When the received file is moved from the facsimile modem receiver 18R to the corresponding facsimile confidential reception box in the facsimile box 28 via the facsimile reception box 29R, a cell having the name of this cell is automatically added to a corresponding file link list as described above. When a file is moved from the facsimile confidential reception box to a corresponding user box in the custom box 26, the cell having the name of this file is automatically deleted from this file link list.

In FIG. 31, when a row in the list 140 is designated and the open button 48 is pressed, a screen (not shown) similar to that of FIG. 8 is displayed. The transmit button means a transfer, the merge button 62 and file storage button 46 of FIG. 8 are not provided and the move button means a movement of the file from the custom box 26 to the user box.

Although the sub box of each user is generated in each of a plurality of main boxes according to this embodiment, only one type of sub boxes whose use applications are limited are displayed for each user if the user selects one main box according to what he or she wants to do. Thus, each user can easily select a desired file in the sub box and perform a job. Further, the data structure for managing the sub boxes of the respective users and the files contained in these sub boxes can be simplified, thereby presenting an effect of improving the program development efficiency of the image forming apparatus.

Further, if a new user name and a password are set on a screen displayed when the edit button 45 is pressed with the custom box 26 selected and opened, sub boxes of this user are respectively generated in the custom box 26, job storage boxes 27J (private/suspended job box 27JP, quick/proof & hold job box 27JQ) and facsimile box 28. Accordingly, a reduction in the operability of the user can be prevented even if three types of user boxes are generated.

Further, if the new user name and password were set, a cell having the new user name and password is added to the user link list for each of the custom box 26, the job storage boxes 27J (private/suspended job box 27JP, quick/proof & hold job box 27JQ) and the facsimile box 28. Thus, even if three types of user boxes are generated and even if the forms of each user are stored in the image synthesis box 27I, a reduction in the operability of the users can be prevented.

The file link list of the cell having the file name is linked with the respective cells of the user link list, and a cell having this file name is added to a corresponding file link list in response to an instruction to register the file in the custom box 26 or job storage box 27J. Therefore, the file management can be performed for each user with a simple link list structure.

In accordance with an instruction to move the file selected in the confidential reception box of the facsimile box 28 to the corresponding user box in the custom box 26, this movement is carried out. Accordingly, there is also an effect that various files can be collectively stored in one user box.

According to this embodiment, the user box of each user is generated in the custom box 26, and the image synthesis box (form box) 27I is generated in the job box 27. Further, the link list is generated in which the name of the user box of each user, the form names and the file names of the forms stored in the form box are related to each other. By operating the operation panel 15, one user box is selected and the files in this user box are selected. On the other hand, the form is selected from only those having the form names corresponding to the user name, and an image having the form overlaid with the selected document is printed if the form overlay printing is selected. Accordingly, even if a user ID is not entered, the forms of each user can be easily selected. There is also an effect that one or more user files to be form-overlaid can be easily selected from the user box.

Further, since the form-overlaid thumbnail is displayed as shown in FIG. 24 before form overlay printing, there is an effect of preventing a print error.

According to this embodiment, out of the files of the data read by the scanner 16S, those of the data from the NIC 17 and those of the data from the facsimile modem 18, only those of the data from the facsimile modem 18 are copied and stored on the removable medium 23 upon being stored on the HDD 14. This brings about an effect of causing no free space shortage of the HDD 14 by the file backup and an effect of effectively backing up only the files of the data from the facsimile modem 18 needed to be backed up most.

Further, among the files having the storage periods designated therefore, those whose planned deletion dates are today or have already passed are moved to the removable medium 23. This brings about an effect of causing no free space shortage of the HDD 14 by the file movements and an effect of effectively storing only the files to be automatically deleted and needed most to be stored.

Further, since only the files in the box of each user in the facsimile box 28 are backed up, the process can be easily performed.

Since it is sufficient to copy the files in the box of each user in the facsimile box 28 to the backup box 24B and move the files in the box of each user in the custom box 26 to the recycle bin 24G, the process can be even more simplified.

According to this embodiment, the planned automatic deletion dates for one or more files selected via the operation panel 15 are changed based on a designated value. Thus, a plurality of planned automatic deletion dates can be collectively changed without providing any box for each storage period.

Since the planned automatic deletion dates are changed only for the files selected in the designated user box, they can be easily changed without making errors.

Further, since the data to be automatically deleted are sorted in a decreasing or increasing order of the deletion dates for the files in the designated user box and a list of corresponding file names are displayed on the operation panel 15, the files to have their planned automatic deletion dates changed can be easily and quickly selected.

Since the extension period of the planned deletion date can be entered, the planned deletion date can be easily changed.

Further, since the planned deletion date is changed by entering the file storage period from the file registration date, it can be suppressed to extend the file storage period more than necessary.

Besides the above embodiment, various modifications are embraced by the present invention. For example, the present invention can be embodied in the following modes [1] to [4].

[1] It is not particularly necessary to generate the work box 29 and the sub boxes therein, and the facsimile box 28 may be used as a work box.

[2] Although the document names and the file names are written in the cells and only the document names are displayed on the screen in the above embodiment, only the file names may be used instead of using the document names. In this case, only specific parts of the file names, e.g. document names may be displayed on the screen. The same holds for the forms and their file names.

[3] In FIG. 22, the cell 1300 is commonly used in the user link list concerning private/suspended jobs and the user link list concerning quick/proof & hold jobs. The two link lists can be, of course, completely separated using two corresponding cells instead of the cell 1300.

[4] The planned deletion date may be set instead of the storage period at the time of file registration in the user box.

The specific embodiment described above mainly embraces inventions having the following constructions.

An image forming apparatus according to one aspect of the present invention comprises a processor; a storage unit connected to the processor for storing a program and data; a function unit connected to the processor for performing specified functional operations; and an interactive input/output unit connected to the processor, wherein the storage unit includes a plurality of first storage areas set in relation to the functional operations, a plurality of second storage areas related as lower storage areas of the first storage areas and set by the user, and a plurality of third storage areas related as lower storage areas of the second storage areas and set by the file, and the program causes the processor to:

(1) display specified information allotted to the plurality of first storage areas on the interactive input/output unit and display information in the plurality of second storage areas in relation to the first storage area on the interactive input/output unit if one of the first storage areas is selected by the interactive input/output unit, (2) display information of files in the third storage areas included in the second storage area and the names of processes to be performed to the files on the interactive input/output unit if one of the second storage areas is selected by the interactive input/output unit, and (3) perform the process to the file if the file and the process are selected by the interactive input/output unit.

In the above construction, it is preferable that the function unit includes a scanner, a printer, a facsimile modem and an network interface; that the storage unit includes a plurality of main boxes generated as the first storage areas; that first to third sub boxes are generated for each user as the second storage areas in each of the plurality of main boxes; that the first sub boxes store files of data read by the scanner or files of data from the network interface; that the second sub boxes store files of data from the facsimile modem moved according to the addresses thereof; that the third sub boxes store first job files obtained by carrying out a bitmap decompression of print data from the network interface; and that the program causes the processor to:

(4) display the names of the plurality of main boxes on the interactive input/output unit, and display information in the sub boxes stored in the main box on the interactive input/output unit if one of the plurality of main boxes is selected by the interactive input/output unit, (5) display information of files included in the sub box and the names of processes to be performed to the files on the interactive input/output unit if one sub box is selected by the interactive input/output unit, and (6) perform the process to the file if the file and the process are selected by the interactive input/output unit.

According to this construction, the sub boxes are generated for each user in each of the plurality of main boxes. If a user selects one main box according to what he or she wants to do, the use application of the sub boxes of the user displayed is restricted to one type. Thus, each user can easily select a desired file in the sub boxes and have a job done. Further, a data structure for managing the sub boxes of each user and the files included in these sub boxes can be simplified, thereby presenting an effect of improving the program development efficiency of the image forming apparatus.

In this case, the program preferably causes the processor to generate sub boxes of a new user name in the one and other main boxes if the new user name and a password are set before the step (5) after one main box is selected and the information of the sub boxes stored in the selected main box is displayed on the interactive input/output unit in the step (4).

Above all, if the new user name and the password are set, a cell having the new user name and the password is preferably added to a user link list in each main box.

According to these constructions, a reduction in user operability can be prevented even if the first to third sub boxes are generated for each user in each of the plurality of main boxes.

Further, it is preferable that file link lists of cells having file names are linked with each cell of the user link list; and that the program causes the processor to add a cell having the name of a file to the corresponding file link list in response to an instruction to register the file in the sub box of the specified main box by the operation of the interactive input/output unit. According to this construction, the files of each user can be managed with a simple link list structure.

In the above construction, the program preferably further causes the processor to move a file selected in the sub box of one main box in response to an instruction to move the file to a corresponding sub box of the other main box by the operation of the interactive input/output unit. According to this construction, various files can be collectively stored in one box.

In the above construction, it is preferable that the storage unit further includes a facsimile transmission work box generated as the main box; and that the program further causes the processor to facsimile-transmit a file selected in the sub box of one main box after moving the file to the facsimile transmission work box in response to an instruction to facsimile-transmit the file by the operation of the interactive input/output unit.

It is preferable that a job storage box and a recopy box are further generated in one main box; that the job storage box stores the first job files; and that the recopy box stores data from the scanner and print attributes added upon printing the data as second job files.

In the above construction, it is preferable that the function unit includes a printer and a network interface; that the storage unit includes first and second job boxes as the first storage areas; that user boxes are generated as the second storage areas for each user in each of the first and second job boxes; that the user boxes in the first job box store third job files not to be printed immediately; that the user boxes in the second job box store fourth job files to be printed immediately; that a first data for distinguishing whether or not each third job file is a file to be deleted immediately after printing and a second data for distinguishing whether each fourth job file is to be continuously printed for a designated number of sets or to have one set and the remaining sets printed at temporally different timings are stored in the storage unit; and that the program causes the processor to:

(7) display the names of the first and second job boxes on the interactive input/output unit, and display information of the user boxes stored in the selected job box on the interactive input/output unit if one of these job boxes is selected by the interactive input/output unit, (8) display information of the job files included in the user box and the names of processes to be performed to the files on the interactive input/output unit if one user box is selected by the interactive input/output unit, and (9) perform the process to the job file if the job file and the process are selected by the interactive input/output unit.

According to this construction, a form of each user can be easily selected even if a user ID is not entered. Further, one or more user files to be form overlaid can be easily selected from the user box.

In this case, the program preferably further causes the processor to:

(10) generate user boxes of a new user name in the first and second job boxes if the new user name and a password are set before the step (8).

In this case, the program preferably causes the processor to add a cell having the new user name and the password to a first user link list in the first job box and add a cell having the new user name to a second user link list in the second job box if the new user name and password are set in the step (10).

Above all, it is preferable that file link lists of cells having file names are linked with the respective cells of the first and second user link lists; and that the program further causes the processor to add a cell having the name of a file to the corresponding file link list in response to an instruction to register the file in the user box of the first or second job box by the operation of the interactive input/output unit.

In the above construction, it is preferable that a removable storage device interface connected to the processor is further provided; that the function unit includes a scanner, a printer, a facsimile modem and a network interface; that first files of data read by the scanner, second files of data from the network interface and third files of data from the facsimile modem are stored as the third storage areas in the storage unit; and that the program causes the processor to:

(11) copy the third file upon storing the third file in the storage unit and store the copied third file in a storage device connected to the removable storage device interface only in the case of the third file.

This construction can bring about an effect of causing no free space shortage in storage unit provided in an image forming apparatus main body by the file backup and an effect of effectively backing up only the third files needed most to be backed up.

In this case, the program preferably further causes the processor to:

(12) store the name, registration date and storage period of a file or the name and planned file deletion date of the file in the storage unit if a storage period is designated for the file to be registered in the storage by the interactive input/output unit, and

(13) move a file, whose planned file deletion date is today or has already passed, to the storage device connected with the removable storage device interface out of the files having the storage period designated therefor.

This construction can bring about an effect of causing no free space shortage of storage unit provided in the image forming apparatus main body by the file backup, and an effect of effectively storing only the files to be automatically deleted and needed most to be stored.

Further, it is preferable that a backup box and a recycle bin are generated in the removable storage device; and the program causes the processor to store the third file in the backup box in the step (11) and to move the first or second file whose planned file deletion date is today or has already passed to the recycle bin in the step (13) because the process can be further simplified.

In the above construction, the program preferably causes the processor to:

(14) designate a data file to be registered and display a first screen on the interactive input/output unit to have a planned automatic deletion date of the data file directly or indirectly designated in response to a registration instruction from the interactive input/output unit,

(15) store a planned automatic deletion data related to the name and the planned automatic deletion date of the data file designated on the first screen in the storage unit,

(16) display a second screen on the interactive input/output unit to change the planned automatic deletion dates of one or more files selected by the interactive input/output unit in response to a storage period changing instruction from the interactive input/output unit,

(17) change the planned automatic deletion data based on a value designated on the second screen, and

(18) delete a corresponding data file from the storage unit if the planned automatic deletion date represented by the planned automatic deletion data is on or before today.

According to this construction, since the planned automatic deletion dates of one ore more files selected by the interactive input/output unit are changed based on the designated value, a plurality of planned automatic deletion dates can be collectively changed without providing a box for each storage period.

In this case, it is preferable that the user boxes for storing data files are generated as the second storage areas for the respective users in the storage unit; and the program further causes the processor to display a list of files included in the user file on the interactive input/output unit in response to an instruction to select and open the user box from the interactive input/output unit, and to store data files to be registered in the step (14) in the corresponding user box and perform the processes in the steps (15) to (18) to the data files in the selected user box.

According to this construction, the planned automatic deletion dates can be easily changed without making errors since the planned automatic deletion date is changed only for the data files selected in the designated user box.

In this case, the program preferably further causes the processor to sort only the planned automatic deletion data concerning the data files in the corresponding user box in a decreasing or increasing order of the planned deletion dates and display a list of the names of the corresponding data files on the interactive input/output unit in response to a sorting instruction from the interactive input/output unit before the step (16). According to this construction, the files whose planned automatic deletion dates are to be changed can be easily and quickly selected.

Further, the second screen in the step (16) preferably includes an area used to enter an extension period of the planned deletion date. According to this construction, the planned deletion date can be easily changed since the extension period of the planned deletion date can be entered.

Further, the second screen in the step (16) preferably includes an area used to enter a file storage period from a file registration date. According to this construction, it can be suppressed to extend the file storage period more than necessary.

In the above construction, it is preferable that the function unit includes a scanner and a printer; that user boxes and form boxes are generated as the second storage areas for the respective users in the storage unit; that both user boxes and form boxes store files of data read by the scanner; that a form management data in which the names of the user boxes of the respective users and the names of forms stored in the form boxes or the file names thereof are related to each other is stored in the storage unit; and that the program causes the processor to:

(19) display a list of the user boxes on the interactive input/output unit,

(20) display the names of documents or the names of files thereof stored in the user box on the interactive input/output unit if one user box is selected by the interactive input/output unit,

(21) display form names or file names concerning the name of the selected user box on the interactive input/output unit based on the form management data in accordance with the operation of the interactive input/output unit, and

(22) generate an image data obtained by overlaying an image of the file having the document name with the form name or file name and have the printer print the generated image data if the document name or its file name is selected between the steps (20) and (21) and the form name or its file name is selected and a form overlay printing is selected between the steps (21) and (22).

According to this construction, the form of each user can be easily selected even if a user ID is not entered. Further, one or more user files to be form overlaid can be easily selected from the user box.

In this case, the program preferably further causes the processor to display thumbnails of the forms and display synthesized images of thumbnails of the selected form files and thumbnails of the selected document files on a screen used to select the form in response to an instruction from the interactive input/output unit in the step (21).

According to this construction, a print error can be prevented since the form overlaid thumbnails are displayed before the form overlay printing.

This application is based on patent application Nos. 2006-259792, 2006-259793, 2006-259794, 2006-259795 and 2006-259796 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. An image forming apparatus, comprising:
a processor;
a storage unit connected to the processor for storing a program and data;
a function unit connected to the processor for performing specified functional operations, the function unit including a scanner, a printer, a facsimile modem and a network interface;
a removable storage device interface connected to the processor; and
an interactive input/output unit connected to the processor, wherein:
the storage unit includes a plurality of first storage areas set in relation to the functional operations, a plurality of second storage areas related as lower storage areas of the first storage areas and set by the user, and a plurality of third storage areas related as lower storage areas of the second storage areas and set by the file, the third storage areas storing first files of data read by the scanner, second files of data from the network interface and third files of data from the facsimile modem, and
the program causes the processor to:
(1) display specified information allotted to the plurality of first storage areas on the interactive input/output unit and display information in the plurality of second storage areas in relation to the first storage area on the interactive input/output unit if one of the first storage areas is selected by the interactive input/output unit, (2) display information of files in the third storage areas included in the second storage area and the names of processes to be performed to the files on the interactive input/output unit if one of the second storage areas is selected by the interactive input/output unit, (3) perform the process to the file if the file and the process are selected by the interactive input/output unit, and (4) execute such that a file is copied and stored in a storage device connected to the removable storage device interface only if the file being stored in the storage unit is one of the third files.

2. An image forming apparatus according to claim 1, wherein:

the storage unit includes a plurality of main boxes generated as the first storage areas;

first to third sub boxes are generated for each user as the second storage areas in each of the plurality of main boxes;

the first sub boxes store files of data read by the scanner or files of data from the network interface;

the second sub boxes store files of data from the facsimile modem moved according to the addresses thereof;

the third sub boxes store first job files obtained by carrying out a bitmap decompression of print data from the network interface; and the program causes the processor to:

(4) display the names of the plurality of main boxes on the interactive input/output unit, and display information in the sub boxes stored in the main box on the interactive input/output unit if one of the plurality of main boxes is selected by the interactive input/output unit, (5) display information of files included in the sub box and the names of processes to be performed to the files on the interactive input/output unit if one sub box is selected by the interactive input/output unit, and (6) perform the process to the file if the file and the process are selected by the interactive input/output unit.

3. An image forming apparatus according to claim 2, wherein the program further causes the processor to generate sub boxes of a new user name in the one and other main boxes if the new user name and a password are set before the step (5) after one main box is selected and the information of the sub boxes stored in the selected main box is displayed on the interactive input/output unit in the step (4).

4. An image forming apparatus according to claim 3, wherein the program further causes the processor to add a cell having the new user name and the password to a user link list in each main box if the new user name and the password are set.

5. An image forming apparatus according to claim 4, wherein:

file link lists of cells having file names are linked with each cell of the user link list; and the program further causes the processor to add a cell having the name of a file to the corresponding file link list in response to an instruction to register the file in the sub box of the specified main box by the operation of the interactive input/output unit.

6. An image forming apparatus according to claim 3, wherein the program further causes the processor to move a file selected in the sub box of one main box in response to an instruction to move the file to a corresponding sub box of the other main box by the operation of the interactive input/output unit.

7. An image forming apparatus according to claim 3, wherein:

a facsimile transmission work box is further generated as the main box in the storage unit; and the program further causes the processor to facsimile-transmit a file selected in the sub box of one main box after moving the file to the facsimile transmission work box in response to an instruction to facsimile-transmit the file by the operation of the interactive input/output unit.

8. An image forming apparatus according to claim 3, wherein a job storage box and a recopy box are further generated in one main box;

the job storage box stores the first job files; and the recopy box stores data from the scanner and print attributes added upon printing the data as second job files.

9. An image forming apparatus according to claim 1, wherein:

the storage unit includes first and second job boxes as the first storage areas;

user boxes are generated as the second storage areas for each user in each of the first and second job boxes;

the user boxes in the first job box store third job files not to be printed immediately;

the user boxes in the second job box store fourth job files to be printed immediately;

a first data for distinguishing whether or not each third job file is a file to be deleted immediately after printing and a second data for distinguishing whether each fourth job file is to be continuously printed for a designated number of sets or to have one set and the remaining sets printed at temporally different timings are stored in the storage unit; and the program causes the processor to:

(7) display the names of the first and second job boxes on the interactive input/output unit, and display information of the user boxes stored in the selected job box on the interactive input/output unit if one of these job boxes is selected by the interactive input/output unit, (8) display information of the job files included in the user box and the names of processes to be performed to the files on the interactive input/output unit if one user box is selected by the interactive input/output unit, and (9) perform the process to the job file if the job file and the process are selected by the interactive input/output unit.

10. An image forming apparatus according to claim 9, wherein the program further causes the processor to:

(10) generate user boxes of a new user name in the first and second job boxes if the new user name and a password are set before the step (8).

11. An image forming apparatus according to claim 10, wherein the program further causes the processor to add a cell having the new user name and the password to a first user link list in the first job box and add a cell having the new user name to a second user link list in the second job box if the new user name and password are set in the step (10).

12. An image forming apparatus according to claim 11, wherein:

file link lists of cells having file names are linked with the respective cells of the first and second user link lists; and the program further causes the processor to add a cell having the name of a file to the corresponding file link list in response to an instruction to register the file in the user box of the first or second job box by the operation of the interactive input/output unit.

13. An image forming apparatus according to claim 1, wherein the program further causes the processor to:
(5) store the name, registration date and storage period of a file or the name and planned file deletion date of the file in the storage unit if a storage period is designated for the file to be registered in the storage by the interactive input/output unit, and
(6) move a file, whose planned file deletion date is today or has already passed, to the storage device connected to the removable storage device interface out of the files having the storage period designated therefor.

14. An image forming apparatus according to claim 13, wherein:
a backup box and a recycle bin are generated in the removable storage device; and
the program causes the processor to:
store the third file in the backup box in the step (11), and
move the first or second file whose planned file deletion date is today or has already passed to the recycle bin in the step (13).

15. An image forming apparatus according to claim 1, wherein the program causes the processor to:
(14) designate a data file to be registered and display a first screen on the interactive input/output unit to have a planned automatic deletion date of the data file directly or indirectly designated in response to a registration instruction from the interactive input/output unit,
(15) store a planned automatic deletion data related to the name and the planned automatic deletion date of the data file designated on the first screen in the storage unit,
(16) display a second screen on the interactive input/output unit to change the planned automatic deletion dates of one or more files selected by the interactive input/output unit in response to a storage period changing instruction from the interactive input/output unit,
(17) change the planned automatic deletion data based on a value designated on the second screen, and
(18) delete a corresponding data file from the storage unit if the planned automatic deletion date represented by the planned automatic deletion data is on or before today.

16. An image forming apparatus according to claim 15, wherein:
the user boxes for storing data files are generated as the second storage areas for the respective users in the storage unit; and
the program further causes the processor to:
display a list of files included in the user file on the interactive input/output unit in response to an instruction to select and open the user box from the interactive input/output unit, and
store data files to be registered in the step (14) in the corresponding user box and perform the processes in the steps (15) to (18) to the data files in the selected user box.

17. An image forming apparatus according to claim 16, wherein:
the program further causes the processor to sort only the planned automatic deletion data concerning the data files in the corresponding user box in a decreasing or increasing order of the planned deletion dates and display a list of the names of the corresponding data files on the interactive input/output unit in response to a sorting instruction from the interactive input/output unit before the step (16).

18. An image forming apparatus according to claim 17, wherein the second screen in the step (16) includes an area used to enter an extension period of the planned deletion date.

19. An image forming apparatus according to claim 17, wherein the second screen in the step (16) includes an area used to enter a file storage period from a file registration date.

20. An image forming apparatus according to claim 1, wherein:
the user boxes and form boxes are generated as the second storage areas for the respective users in the storage unit;
both user boxes and form boxes store files of data read by the scanner;
a form management data in which the names of the user boxes of the respective users and the names of forms stored in the form boxes or the file names thereof are related to each other is stored in the storage unit; and
the program causes the processor to:
(19) display a list of the user boxes on the interactive input/output unit,
(20) display the names of documents or the names of files thereof stored in the user box on the interactive input/output unit if one user box is selected by the interactive input/output unit,
(21) display form names or file names concerning the name of the selected user box on the interactive input/output unit based on the form management data in accordance with the operation of the interactive input/output unit, and
(22) generate an image data obtained by overlaying an image of the file having the document name with the form name or file name and have the printer print the generated image data if the document name or its file name is selected between the steps (20) and (21) and the form name or its file name is selected and a form overlay printing is selected between the steps (21) and (22).

21. An image forming apparatus according to claim 20, wherein the program further causes the processor to display thumbnails of the forms and display synthesized images of thumbnails of the selected form files and thumbnails of the selected document files on a screen used to select the form in response to an instruction from the interactive input/output unit in the step (21).

* * * * *